(12) United States Patent
Nakamoto et al.

(10) Patent No.: US 11,740,524 B2
(45) Date of Patent: Aug. 29, 2023

(54) LIQUID CRYSTAL DISPLAY DEVICE

(71) Applicant: Sharp Display Technology Corporation, Kameyama (JP)

(72) Inventors: Tatsuya Nakamoto, Kameyama (JP); Takashi Nakao, Kameyama (JP); Nobuyoshi Nagashima, Kameyama (JP); Hidetoshi Nakagawa, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 17/984,056

(22) Filed: Nov. 9, 2022

(65) Prior Publication Data

US 2023/0152644 A1    May 18, 2023

Related U.S. Application Data

(60) Provisional application No. 63/278,678, filed on Nov. 12, 2021.

(51) Int. Cl.
*G02F 1/1368* (2006.01)
*G02F 1/1362* (2006.01)

(52) U.S. Cl.
CPC ...... *G02F 1/136286* (2013.01); *G02F 1/1368* (2013.01); *G02F 1/136204* (2013.01)

(58) Field of Classification Search
CPC . G02F 1/1368; G02F 1/136204; G02F 1/1399
See application file for complete search history.

(56) References Cited

U.S. PATENT DOCUMENTS

| | | | |
|---|---|---|---|
| 2010/0053459 | A1 | 3/2010 | Matsuda et al. |
| 2012/0218245 | A1 | 8/2012 | Morii et al. |
| 2018/0157132 | A1* | 6/2018 | Shim ................. G02F 1/136286 |
| 2019/0165072 | A1 | 5/2019 | Wang |
| 2020/0174325 | A1 | 6/2020 | Wang |

FOREIGN PATENT DOCUMENTS

| | | |
|---|---|---|
| CN | 111427209 A | 7/2020 |
| JP | 2009-204644 A | 9/2009 |
| WO | 2008/087899 A1 | 7/2008 |
| WO | 2011/055584 A1 | 5/2011 |

* cited by examiner

*Primary Examiner* — James A Dudek
(74) *Attorney, Agent, or Firm* — ScienBiziP, P.C.

(57) ABSTRACT

A liquid crystal display device includes an active matrix substrate, a counter substrate, a liquid crystal layer, and a sealing portion. The active matrix substrate includes a substrate, a gate wiring line drive circuit monolithically formed on the substrate, a capacitance element supported by the substrate and provided at least partially overlapping the sealing portion when viewed from a direction normal to a display surface, the capacitance element including a first capacitance electrode, a second capacitance electrode disposed opposite the first capacitance electrode and between the first capacitance electrode and the sealing portion, and a dielectric layer located between the first capacitance electrode and the second capacitance electrode, and a transparent electrode formed of a transparent conductive material, disposed between the capacitance element and the sealing portion, and electrically connected to the second capacitance electrode.

21 Claims, 28 Drawing Sheets

LIQUID CRYSTAL DISPLAY DEVICE

CROSS-REFERENCE TO RELATED APPLICATIONS

This application claims the benefit of priority to U.S. Provisional Application No. 63/278,678 filed on Nov. 12, 2021. The entire contents of the above-identified application are hereby incorporated by reference.

BACKGROUND

Technical Field

The disclosure relates to a liquid crystal display device.

In a peripheral region (also referred to as a "non-display region" or a "frame region") of an active matrix substrate, peripheral circuits such as a drive circuit may be monolithically (integrally) formed. By forming the peripheral circuits monolithically, the peripheral region can be narrowed (frame narrowing) and the mounting process can be simplified, resulting in cost reduction. For example, in the peripheral region, a gate driver circuit may be formed monolithically.

The monolithically formed gate driver circuit is referred to as a gate driver on array (GOA) circuit, a gate driver monolithic (GDM) circuit, and the like. The liquid crystal display device disclosed in WO 2011/055584 includes a GOA circuit formed on an active matrix substrate.

SUMMARY

In a liquid crystal display panel including a GOA circuit formed on an active matrix substrate, when an electro-static discharge (ESD) occurs and damages the GOA circuit, leakage may occur, causing a display failure or lighting failure.

An embodiment of the disclosure has been made in view of the above problems, and an object of the disclosure is to provide a liquid crystal display device in which damage to a GOA circuit caused by an ESD is suppressed.

According to embodiments of the disclosure, solutions described in the following items are provided.

Item 1

A liquid crystal display device includes:
a plurality of pixels;
an active matrix substrate;
a counter substrate located opposite the active matrix substrate;
a liquid crystal layer provided between the active matrix substrate and the counter substrate; and
a sealing portion provided between the active matrix substrate and the counter substrate and disposed enclosing the liquid crystal layer.

In the liquid crystal display device, the active matrix substrate includes:
a substrate,
a gate wiring line drive circuit monolithically formed on the substrate,
a capacitance element supported by the substrate and provided at least partially overlapping the sealing portion when viewed from a direction normal to a display surface, the capacitance element including a first capacitance electrode, a second capacitance electrode disposed opposite the first capacitance electrode and between the first capacitance electrode and the sealing portion, and a dielectric layer located between the first capacitance electrode and the second capacitance electrode, and
a transparent electrode formed of a transparent conductive material, disposed between the capacitance element and the sealing portion, and electrically connected to the second capacitance electrode.

Item 2

The liquid crystal display device according to Item 1, wherein an upper surface of the transparent electrode is in contact with the sealing portion.

Item 3

The liquid crystal display device according to Item 1 or 2, wherein the transparent electrode extends to an end portion of the substrate.

Item 4

The liquid crystal display device according to Item 1 or 2, wherein the second capacitance electrode includes a body portion located opposite the first capacitance electrode with the dielectric layer between the body portion and the first capacitance electrode and an extending portion extending from the body portion to an end portion of the substrate.

Item 5

The liquid crystal display device according to Item 4, wherein the extending portion has a comb shape.

Item 6

The liquid crystal display device according to any one of Items 1 to 5, wherein the active matrix substrate includes:
a TFT provided in each of the plurality of pixels and including a semiconductor layer, a gate electrode located opposite the semiconductor layer with a gate insulating layer between the gate electrode and the semiconductor layer, and a source electrode electrically connected to the semiconductor layer, and
a pixel electrode provided in each of the plurality of pixels and electrically connected to the TFT;
the first capacitance electrode is formed in the same layer as the gate electrode;
the second capacitance electrode is formed in the same layer as the source electrode;
the dielectric layer includes a first layer formed in the same layer as the gate insulating layer; and
the transparent electrode is formed in the same layer as the pixel electrode.

Item 7

The liquid crystal display device according to Item 6, wherein the semiconductor layer of the TFT includes an intrinsic semiconductor layer and a doped semiconductor layer provided on the intrinsic semiconductor layer; and
the dielectric layer of the capacitance element further includes a second layer formed in the same layer as the intrinsic semiconductor layer and a third layer formed in the same layer as the doped semiconductor layer.

Item 8

The liquid crystal display device according to Item 6 or 7, wherein the active matrix substrate includes a plurality of the capacitance elements; and
the second capacitance electrodes of the plurality of capacitance elements are formed separated from each other.

Item 9

The liquid crystal display device according to any one of Items 6 to 8, wherein the active matrix substrate includes a plurality of the transparent electrodes; and
the plurality of transparent electrodes are formed separated from each other.

Item 10
 A liquid crystal display device includes:
 a plurality of pixels;
 an active matrix substrate;
 a counter substrate located opposite the active matrix substrate;
 a liquid crystal layer provided between the active matrix substrate and the counter substrate; and
 a sealing portion provided between the active matrix substrate and the counter substrate and disposed enclosing the liquid crystal layer.
 In the liquid crystal display device, the active matrix substrate includes:
 a substrate,
 a gate wiring line drive circuit monolithically formed on the substrate, and
 a capacitance element supported by the substrate and provided at least partially overlapping the sealing portion when viewed from a direction normal to a display surface, the capacitance element including a first capacitance electrode, a second capacitance electrode disposed opposite the first capacitance electrode and between the first capacitance electrode and the sealing portion, and a dielectric layer located between the first capacitance electrode and the second capacitance electrode; and
 the second capacitance electrode is formed of a transparent conductive material.

Item 11
 The liquid crystal display device according to Item 10, wherein an upper surface of the second capacitance electrode is in contact with the sealing portion.

Item 12
 The liquid crystal display device according to Item 10 or 11, wherein the second capacitance electrode extends to an end portion of the substrate.

Item 13
 The liquid crystal display device according to any one of Items 10 to 12, wherein the active matrix substrate includes:
 a TFT provided in each of the plurality of pixels and including a semiconductor layer, a gate electrode located opposite the semiconductor layer with a gate insulating layer between the gate electrode and the semiconductor layer, and a source electrode electrically connected to the semiconductor layer; and
 a pixel electrode provided in each of the plurality of pixels and electrically connected to the TFT;
 the first capacitance electrode is formed in the same layer as the gate electrode;
 the second capacitance electrode is formed in the same layer as the pixel electrode; and
 the dielectric layer includes a first layer formed in the same layer as the gate insulating layer.

Item 14
 The liquid crystal display device according to Item 13, wherein the semiconductor layer of the TFT includes an intrinsic semiconductor layer; and
 the dielectric layer of the capacitance element further includes a second layer formed in the same layer as the intrinsic semiconductor layer.

Item 15
 The liquid crystal display device according to any one of Items 10 to 12, wherein the active matrix substrate includes:
 a TFT provided in each of the plurality of pixels and including a semiconductor layer, a gate electrode located opposite the semiconductor layer with a gate insulating layer between the gate electrode and the semiconductor layer, and a source electrode electrically connected to the semiconductor layer, and
 a pixel electrode provided in each of the plurality of pixels and electrically connected to the TFT;
 the first capacitance electrode is formed in the same layer as the source electrode; and
 the second capacitance electrode is formed in the same layer as the pixel electrode.

Item 16
 The liquid crystal display device according to any one of Items 10 to 12, wherein the first capacitance electrode is formed of a transparent conductive material.

Item 17
 The liquid crystal display device according to Item 16, wherein the active matrix substrate includes an additional capacitance element including the first capacitance electrode, a third capacitance electrode disposed opposite the first capacitance electrode and between the first capacitance electrode and the substrate, and an additional dielectric layer located between the first capacitance electrode and the third capacitance electrode.

Item 18
 The liquid crystal display device according to Item 17, wherein the active matrix substrate includes:
 a TFT provided in each of the plurality of pixels and including a semiconductor layer, a gate electrode located opposite the semiconductor layer with the gate insulating layer between the gate electrode and the semiconductor layer, and a source electrode electrically connected to the semiconductor layer, and
 a pixel electrode provided in each of the plurality of pixels and electrically connected to the TFT;
 the second capacitance electrode is formed in the same layer as the pixel electrode; and
 the third capacitance electrode is formed in the same layer as the gate electrode or the source electrode.

Item 19
 The liquid crystal display device according to any one of Items 10 to 12, wherein the active matrix substrate includes two or more insulating layers between the first capacitance electrode and the second capacitance electrode;
 an opening is formed in at least one insulating layer of the two or more insulating layers; and
 the second capacitance electrode includes a portion located in the opening.

Item 20
 The liquid crystal display device according to any one of Items 10 to 19, wherein the active matrix substrate includes a plurality of the second capacitance electrodes; and
 the plurality of second capacitance electrodes are formed separated from each other.

Item 21
 The liquid crystal display device according to any one of Items 1 to 20, wherein a direct current signal is supplied to the first capacitance electrode.

An embodiment of the disclosure can provide a liquid crystal display device in which damage to a GOA circuit caused by an ESD is suppressed.

BRIEF DESCRIPTION OF DRAWINGS

The disclosure will be described with reference to the accompanying drawings, wherein like numbers reference like elements.

DESCRIPTION OF EMBODIMENTS

Hereinafter, embodiments of the disclosure will be described with reference to the accompanying drawings. Note that the disclosure is not limited to the embodiments to be described below.

First Embodiment

Figure 1:
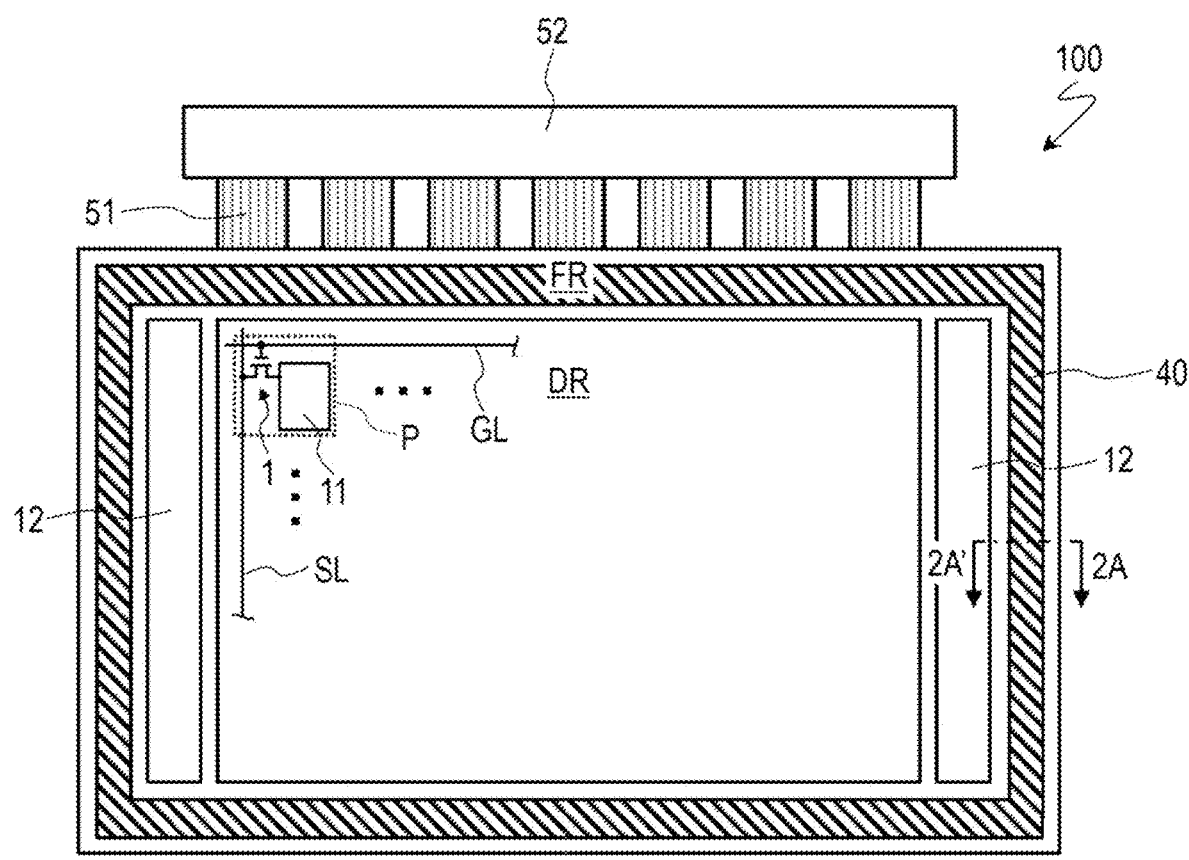
FIG. 1 is a plan view schematically illustrating a liquid crystal display device 100 according to an embodiment of the disclosure.
Figure 2:
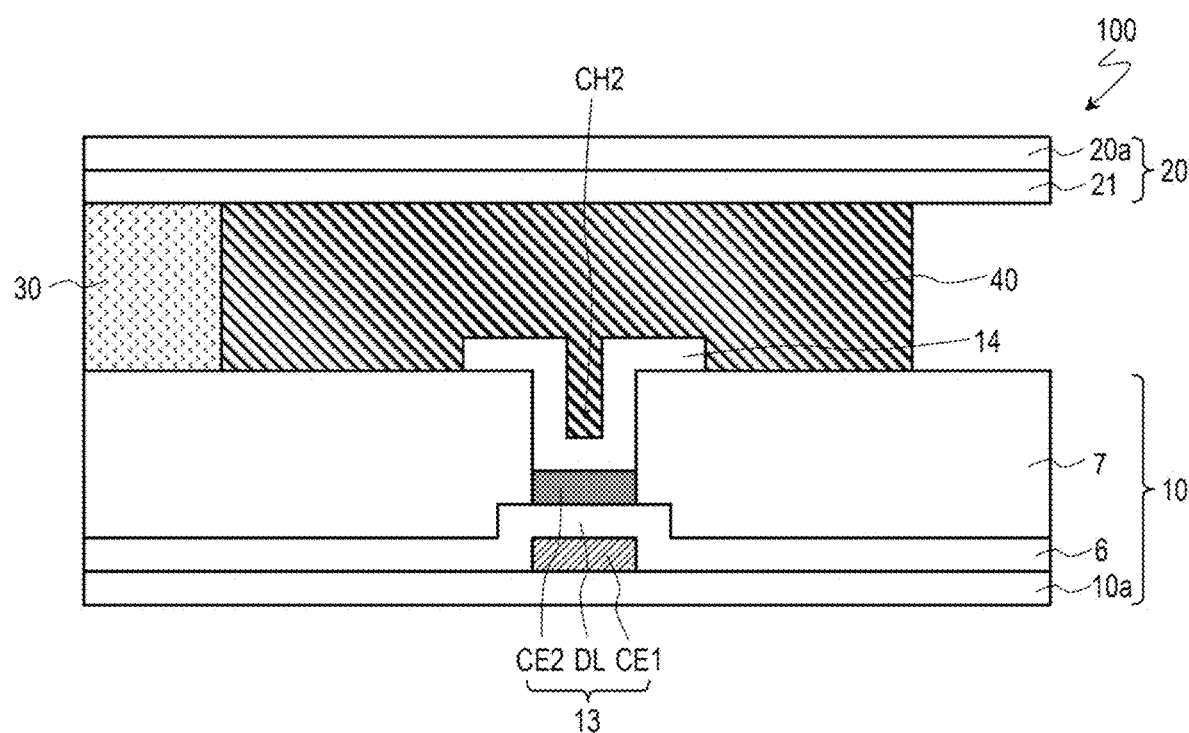
FIG. 2 is a cross-sectional view schematically illustrating the liquid crystal display device 100 and illustrates a cross section along the line 2A-2A' in FIG. 1.

A liquid crystal display device 100 according to the present embodiment will be described with reference to FIGS. 1 and 2. FIGS. 1 and 2 are a plan view and a cross-sectional view schematically illustrating the liquid crystal display device 100, respectively. FIG. 2 illustrates a cross section taken along a line 2A-2A' in FIG. 1.

The liquid crystal display device 100, as illustrated in FIG. 1, includes a display region DR and a peripheral region FR. The display region DR is defined by a plurality of pixels P arranged in a matrix. Each of the pixels P is provided with a thin film transistor (TFT) 1 and a pixel electrode 11. The TFT 1 is supplied with a gate signal from a corresponding gate wiring line GL, from among a plurality of gate wiring lines GL extending in the row direction, and is supplied with a source signal from a corresponding source wiring line SL, from among a plurality of source wiring lines SL extending in the column direction. The pixel electrode 11 is formed of a transparent conductive material (an indium tin oxide or an indium zinc oxide, for example) and is electrically connected to the TFT 1.

The peripheral region FR is located around the display region DR. The peripheral region FR is a region where nothing is displayed and may be referred to as a "non-display region" or a "frame region".

As illustrated in FIG. 2, the liquid crystal display device 100 includes an active matrix substrate 10, a counter substrate 20, a liquid crystal layer 30, and a sealing portion 40.

The active matrix substrate 10 includes the TFT 1, the pixel electrode 11, the gate wiring line GL, and the source wiring line SL, which are described above, and a substrate 10a that supports them. The substrate 10a is, for example, a glass substrate.

Additionally, the active matrix substrate 10 includes a gate wiring line drive circuit (hereinafter referred to as a "GOA circuit") 12 monolithically formed on the substrate 10a (not illustrated in FIG. 2). The GOA circuit 12 is disposed in the peripheral region FR and drives the gate wiring line GL. The specific circuit configuration of the GOA circuit 12 is not particularly limited, and various known circuit configurations may be used.

A plurality of drive circuit substrates (for example, COF substrates) 51 installed with source wiring line drive circuits (not illustrated) for driving the source wiring lines SL are attached to an end portion of the active matrix substrate 10, and a source-side printed circuit board (PWB) 52 is connected to the drive circuit substrates 51.

The counter substrate 20 is disposed opposite the active matrix substrate 10. The counter substrate 20 includes a common electrode 21 provided opposite the pixel electrode 11 and a substrate 20a that supports the common electrode 21. The substrate 20a is, for example, a glass substrate. Typically, the counter substrate 20 further includes a color filter layer 22 and a light blocking layer (black matrix) 23 (see FIG. 3 described below).

The liquid crystal layer 30 is provided between the active matrix substrate 10 and the counter substrate 20. Although not illustrated, in the display region DR, an alignment film is formed on the active matrix substrate 10 and the counter substrate 20 on the outermost surfaces on the liquid crystal layer 30 side.

The sealing portion 40 is provided between the active matrix substrate 10 and the counter substrate 20 and is disposed enclosing the liquid crystal layer 30. Also, the sealing portion 40 is located in the peripheral region FR, and the GOA circuit 12 is located between the sealing portion 40 and the display region DR. That is, the sealing portion 40 can be said to be located on the outer peripheral side of the GOA circuit 12. The sealing portion 40 may be formed of a photosensitive resin material. The sealing portion 40 may include conductive particles.

Figure 3:
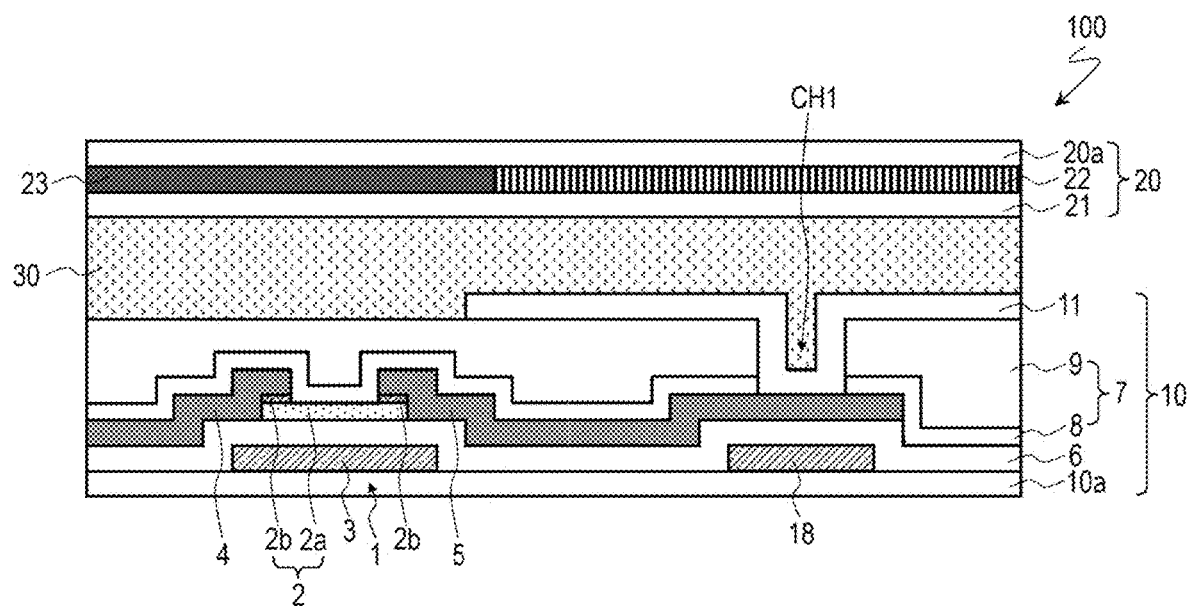
FIG. 3 is a cross-sectional view illustrating an example of a TFT 1 included in an active matrix substrate 10 of the liquid crystal display device 100.

As described above, the active matrix substrate 10 includes the TFT 1 provided in each pixel. FIG. 3 is a view illustrating an example of the TFT 1 (a cross-sectional structure near the TFT 1).

The TFT 1 illustrated in FIG. 3 has a bottom gate structure and includes a semiconductor layer 2, a gate electrode 3, a source electrode 4, and a drain electrode 5. The gate electrode 3 is formed on the substrate 10a and is covered by a gate insulating layer 6. The semiconductor layer 2 is formed on the gate insulating layer 6 and opposite the gate electrode 3. In other words, the gate electrode 3 is opposite the semiconductor layer 2 with the gate insulating layer 6 therebetween. The source electrode 4 and the drain electrode 5 are formed on the semiconductor layer 2 and on the gate insulating layer 6 and are electrically connected to the semiconductor layer 2.

In the illustrated example, the semiconductor layer 2 includes an intrinsic semiconductor layer 2a and a doped semiconductor layer (for example, a phosphorus-doped n-type semiconductor layer) 2b doped with impurities to reduce resistance. The doped semiconductor layer 2b is provided on the intrinsic semiconductor layer 2a. The doped semiconductor layer 2b is formed in the source region and the drain region and is not formed in the channel region. The source electrode 4 and the drain electrode 5 are electrically connected to the intrinsic semiconductor layer 2a via the doped semiconductor layer 2b.

The TFT 1 is covered by an interlayer insulating layer 7. Here, the interlayer insulating layer 7 has a structure in which an inorganic insulating layer (passivation layer) 8 and an organic insulating layer (flattening layer) 9 are layered in this order. The pixel electrode 11 is provided on the interlayer insulating layer 7 and is connected to the drain electrode 5 of the TFT 1 at a contact hole CH1 formed in the interlayer insulating layer 7. In the illustrated example, an auxiliary capacitance electrode 18 is provided opposite the drain electrode 5 with the gate insulating layer 6 therebetween, and an auxiliary capacitor is formed by the drain electrode 5, the auxiliary capacitance electrode 18, and the gate insulating layer 6 located therebetween. The structure of the auxiliary capacitor is not limited to this example.

As the material of the gate electrode 3, the source electrode 4, and the drain electrode 5, various known conductive materials can be used. Also, various known insulating materials can be used as the material of the gate insulating layer 6 and the inorganic insulating layer 8. The organic insulating layer 9 may be formed of a photosensitive resin material, for example.

Figure 4:
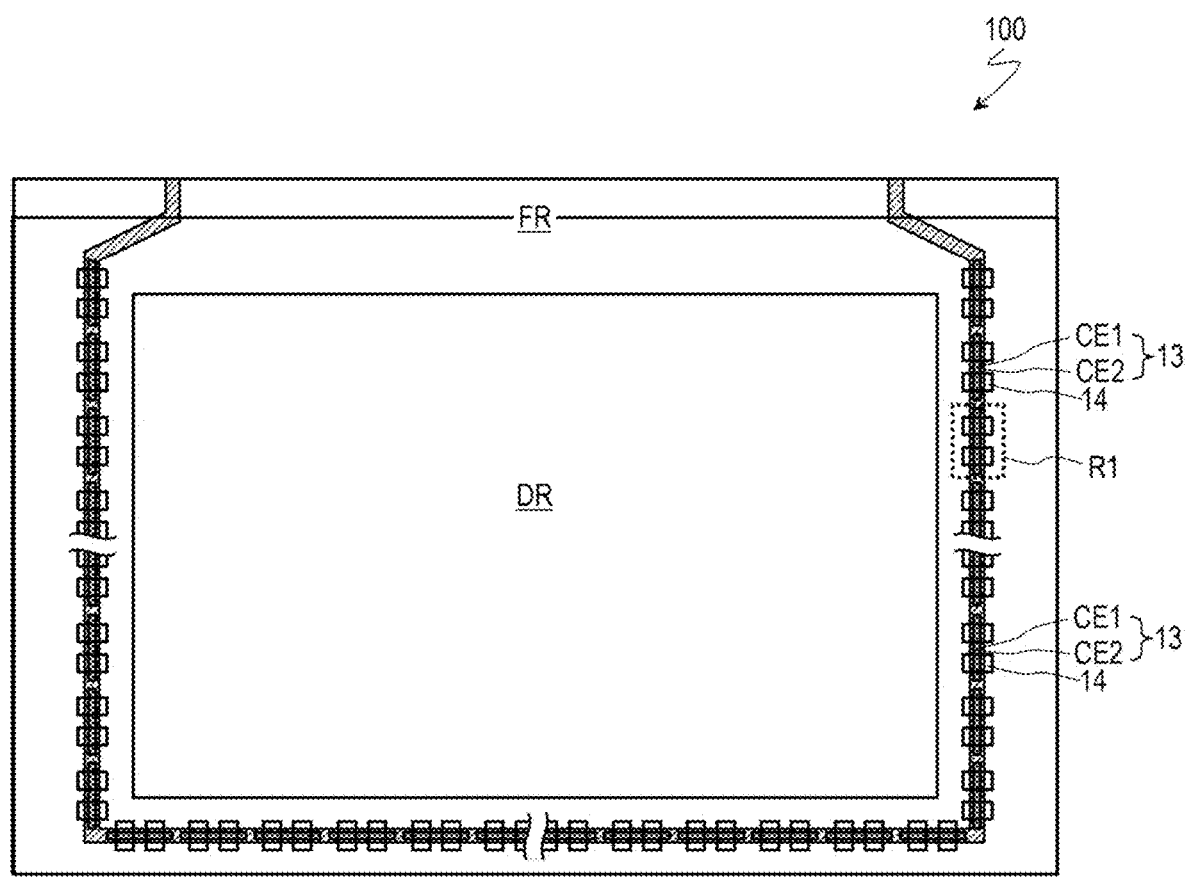
FIG. 4 is a plan view for describing the arrangement of capacitance elements 13 and transparent electrodes 14 included in the active matrix substrate 10 of the liquid crystal display device 100.
Figure 5:
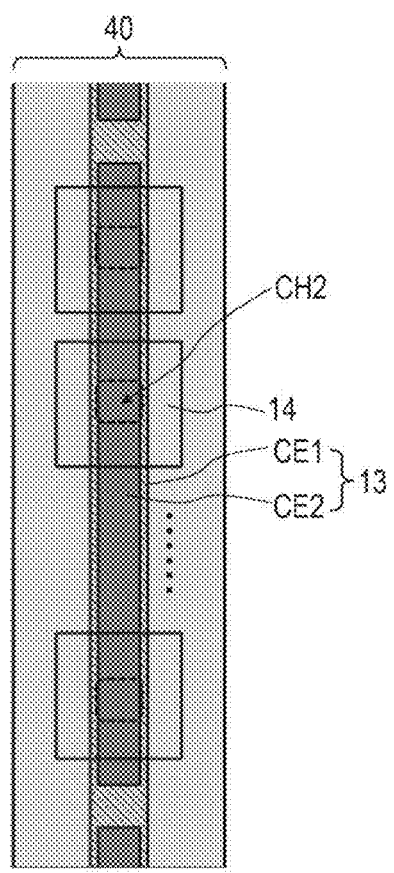
FIG. 5 is an enlarged view of a portion (a region R1 surrounded by a dotted line) in FIG. 4.

In the present embodiment, as illustrated in FIG. 2, the active matrix substrate 10 is supported by the substrate 10a and further includes a capacitance element 13 provided at least partially overlapping (in the illustrated example, entirely overlapping) the sealing portion 40 when seen from a direction normal to a display surface (the direction normal to the main surface of the substrate 10a) and a transparent electrode 14 disposed between the capacitance element 13 and the sealing portion 40. The specific structure of the capacitance element 13 and the transparent electrode 14 will be further described below with reference to FIGS. 4 and 5. FIG. 4 is a plan view for describing the arrangement of the capacitance elements 13 and the transparent electrodes 14 in the liquid crystal display device 100, and FIG. 5 is an enlarged view illustrating a portion (a region R1 surrounded by a dotted line) in FIG. 4.

In the present embodiment, as illustrated in FIG. 4, the plurality of capacitance elements 13 and the plurality of transparent electrodes 14 are provided in the peripheral region FR. FIG. 5 illustrates the region R1 corresponding to one capacitance element 13.

As illustrated in FIG. 2, each capacitance element 13 includes a first capacitance electrode CE1, a second capacitance electrode CE2, and a dielectric layer DL.

The first capacitance electrode CE1 is formed in the same layer as the gate electrode 3 of the TFT 1. That is, the first capacitance electrode CE1 is formed by patterning a conductive film (gate metal film) used to form the gate electrode 3; thus, the first capacitance electrode CE1 is formed by the same process as the gate electrode 3. A direct current signal is supplied to the first capacitance electrode CE1. The direct current signal is, for example, a common (COM) potential or a ground (GND) potential.

The second capacitance electrode CE2 is disposed opposite the first capacitance electrode CE1 and between the first capacitance electrode CE1 and the sealing portion 40. The second capacitance electrode CE2 is formed in the same layer as the source electrode 4 and the drain electrode 5. That is, the second capacitance electrode CE2 is formed by patterning a conductive film (source metal film) used to form the source electrode 4 and the drain electrode 5; thus, the second capacitance electrode CE2 is formed by the same process as the source electrode 4 and the drain electrode 5. Note that in FIGS. 4 and 5, the width of the first capacitance electrode CE1 is slightly wider than the width of the second capacitance electrode CE2, but as illustrated in FIG. 2, the width of the first capacitance electrode CE1 and the width of the second capacitance electrode CE2 may be substantially the same.

The dielectric layer DL is located between the first capacitance electrode CE1 and the second capacitance electrode CE2. In the present embodiment, a portion of the gate insulating layer 6 formed on substantially the entire surface of the substrate 10a is located between the first capacitance electrode CE1 and the second capacitance electrode CE2 and functions as the dielectric layer DL.

The transparent electrode 14 is formed of a transparent conductive material (an indium tin oxide or an indium zinc oxide, for example). Each transparent electrode 14 is electrically connected to the second capacitance electrode CE2 of the corresponding capacitance element 13. The upper surface of the transparent electrode 14 is in contact with the sealing portion 40. In the present embodiment, the transparent electrode 14 is formed in the same layer as the pixel electrode 11. That is, the transparent electrode 14 is formed by patterning a transparent conductive film used to form the pixel electrode 11; thus, the transparent electrode 14 is formed by the same process as the pixel electrode 11. The transparent electrode 14 is connected to the second capacitance electrode CE2 at a contact hole CH2 formed in the interlayer insulating layer 7.

In the illustrated example, in the peripheral region FR, the first capacitance electrodes CE1 of all the capacitance elements 13 are formed continuous with each other, and the conductive layer (referred to as a "first capacitance electrode layer") including all the first capacitance electrodes CE1 is routed in the peripheral region FR, as a wiring line which a direct current signal is applied to.

Also, the second capacitance electrodes CE2 of the capacitance elements 13 are formed separated from each other. That is, when all the second capacitance electrodes CE2 are collectively referred to as a "second capacitance electrode layer", the second capacitance electrode layer can be said to be divided (subdivided) into a plurality of portions.

Furthermore, two or more transparent electrodes 14 are electrically connected to one second capacitance electrode CE2. That is, two or more transparent electrodes 14 are electrically connected to one capacitance element 13. Note that, in the example illustrated in FIG. 4, two transparent electrodes 14 are connected to one capacitance element 13. In the example illustrated in FIG. 5, more than three transparent electrodes 14 are connected to one capacitance element 13. However, the number of transparent electrodes 14 connected to one capacitance element 13 is not limited to those in these examples. Also, the plurality of transparent electrodes 14 are formed separated from each other, and when all the transparent electrodes 14 are collectively referred to as a "transparent electrode layer", the transparent electrode layer can be said to be divided into a plurality of portions.

In general, when an ESD occurs in a liquid crystal display device, the static electricity entering from the outside may reach the GOA circuit or the display region via the common electrode provided on the counter substrate side, causing leakage.

In the liquid crystal display device 100 according to the present embodiment, the active matrix substrate 10 includes the above-described capacitance element 13 and the transparent electrode 14. Thus, when an ESD occurs, the static electricity entering from the outside can be attracted to the transparent electrode 14 to charge the capacitance element 13. Accordingly, the impact of an ESD can be absorbed, and entrance of static electricity into the GOA circuit 12 and the display region DR can be suppressed. Thus, display failure and lighting failure caused by leakage due to an ESD are suppressed.

The capacitance element 13 is provided at least partially overlapping the sealing portion 40, and the transparent electrode 14 is disposed between the capacitance element 13 and the sealing portion 40 (in other words, at least partially overlapping the sealing portion 40). In general, the sealing portion 40 includes conductive particles or the like for conduction between the common electrode 21 on the counter substrate 20 side and the common wiring line (not illustrated) on the active matrix substrate 10 side. Thus, since the capacitance element 13 and the transparent electrode 14 are disposed at least partially overlapping the sealing portion 40 as described above, the static electricity entering from the outside is easily attracted to the transparent electrode 14.

Because the transparent electrode 14 disposed between the capacitance element 13 and the sealing portion 40 is formed of a transparent conductive material, even when the size of the transparent electrode 14 is increased so that the static electricity is more easily attracted to the transparent electrode 14, the photo-irradiation to the photosensitive resin material, in a case in which the sealing portion 40 is formed of a photosensitive resin material, is not hindered. The size of the capacitance element 13 and the size of the transparent electrode 14 when viewed from the direction normal to the display surface are not particularly limited.

From the perspective of facilitating the attraction of static electricity entering from the outside to the transparent electrode 14, the upper surface of the transparent electrode 14 is preferably directly in contact with the sealing portion 40 as illustrated.

Figure 6:
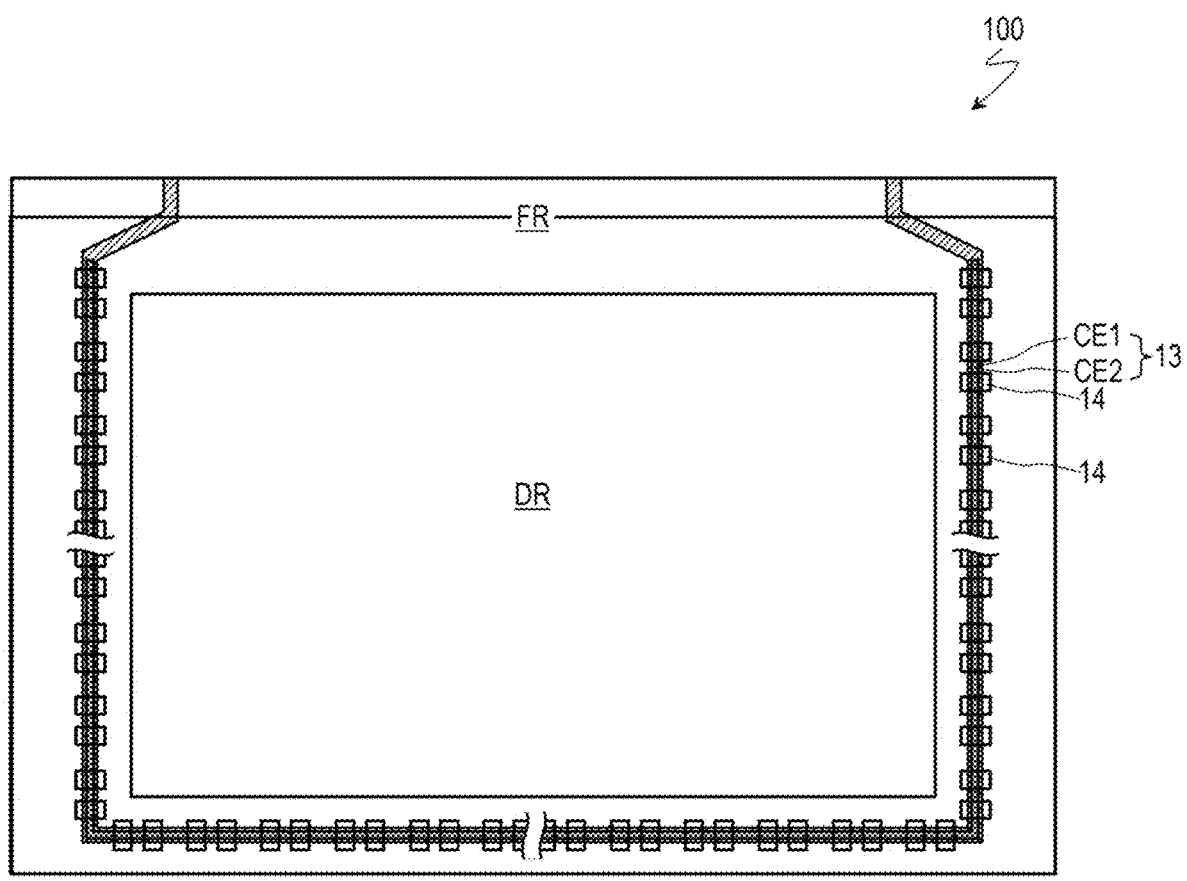
FIG. 6 is a plan view for describing another arrangement of the capacitance element 13 and the transparent electrodes 14 included in the active matrix substrate 10 of the liquid crystal display device 100.

Note that in the example illustrated in FIGS. 4 and 5, the second capacitance electrode layer is divided into a plurality of portions. However, the second capacitance electrode layer need not be divided as illustrated in FIG. 6. In a case in which the second capacitance electrode layer is not divided, one capacitance element 13 is provided in the entire peripheral region FR. As illustrated in FIGS. 4 and 5, the second capacitance electrode layer is divided into a plurality of portions (in other words, the second capacitance electrodes CE2 are formed separated from each other), and thus it is possible to suppress charging by an ESD in the process of preparing the active matrix substrate 10.

Figure 7:
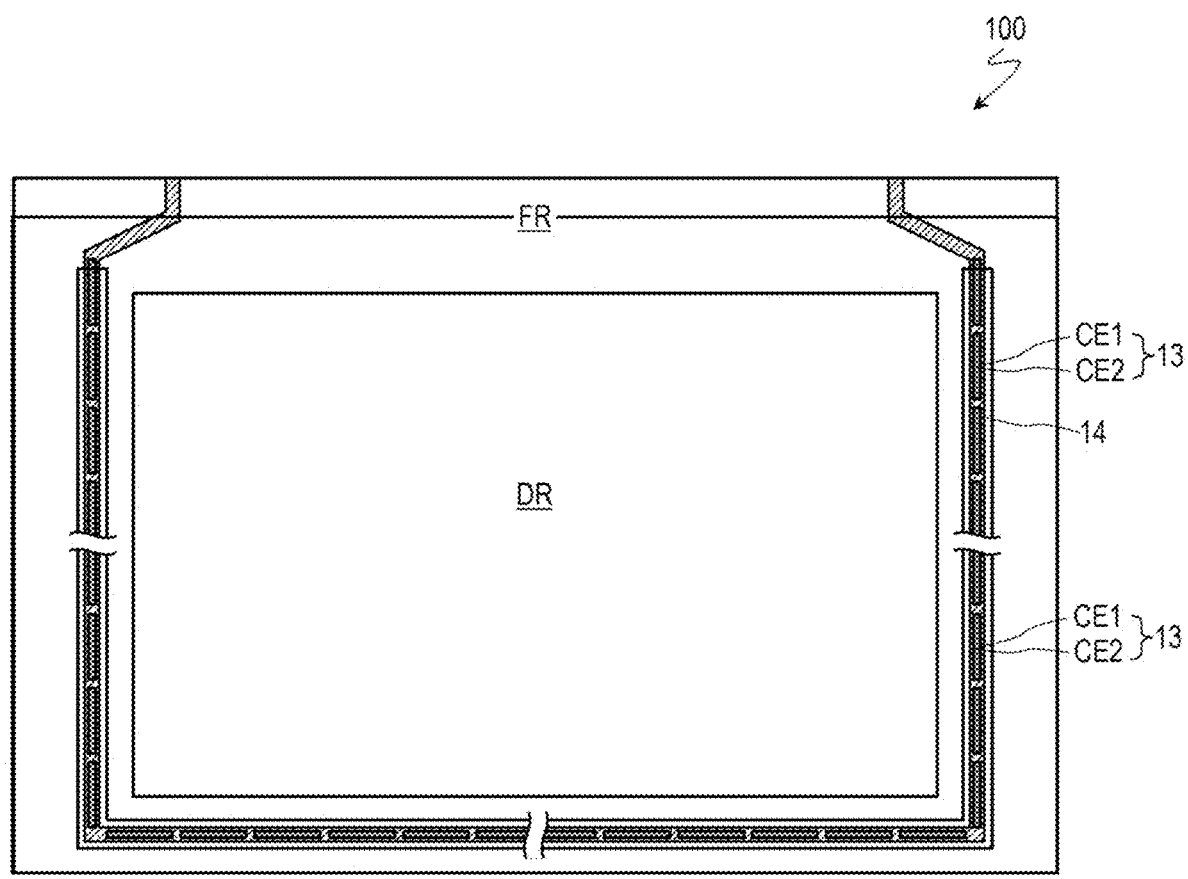
FIG. 7 is a plan view for describing yet another arrangement of the capacitance elements 13 and the transparent electrode 14 included in the active matrix substrate 10 of the liquid crystal display device 100.

Additionally, in the examples illustrated in FIGS. 4 and 5, a plurality of the transparent electrodes 14 are provided (in other words, the transparent electrode layer is divided into a plurality of portions). However, as illustrated in FIG. 7, only one transparent electrode 14 may be provided (in other words, the transparent electrode layer need not be divided). As illustrated in FIGS. 4 and 5, when the transparent electrode layer is divided into a plurality of portions (that is, the plurality of transparent electrodes 14 are formed separated from each other) and an appropriate spacing between adjacent transparent electrodes 14 is provided, it is possible to suppress a decrease in the adhesive strength of the sealing portion 40.

Figure 8:
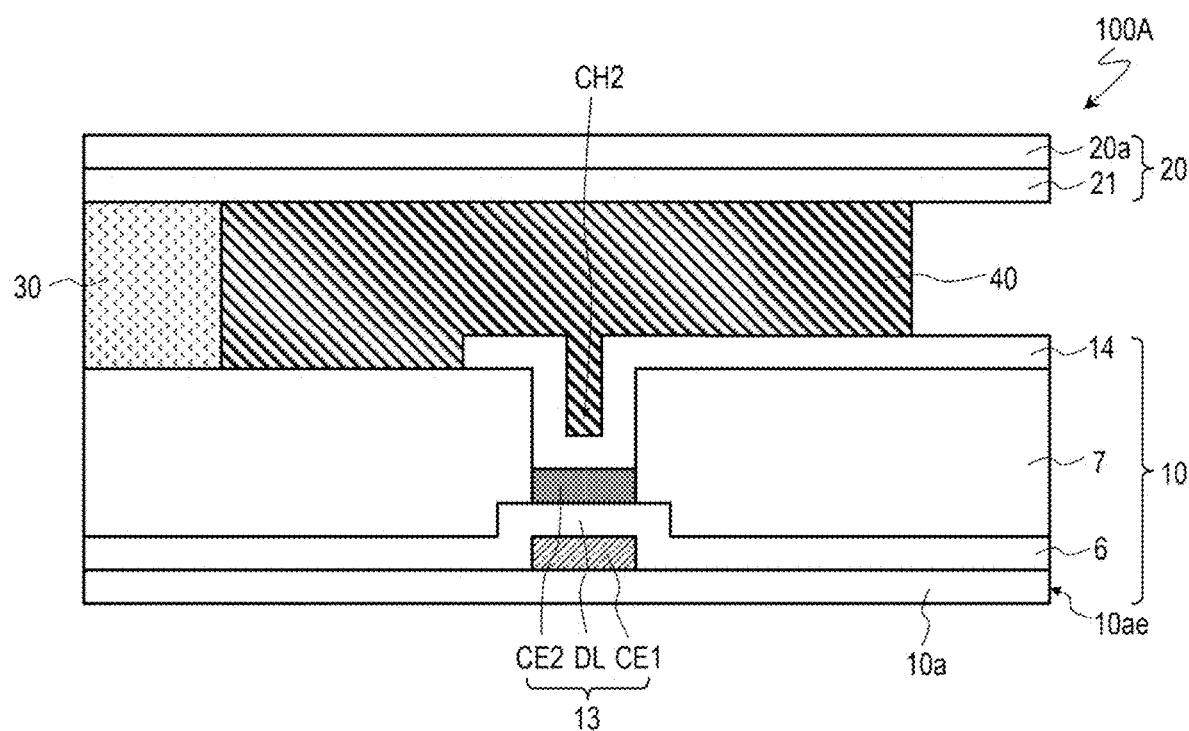
FIG. 8 is a cross-sectional view schematically illustrating another liquid crystal display device 100A according to an embodiment of the disclosure.
Figure 9:
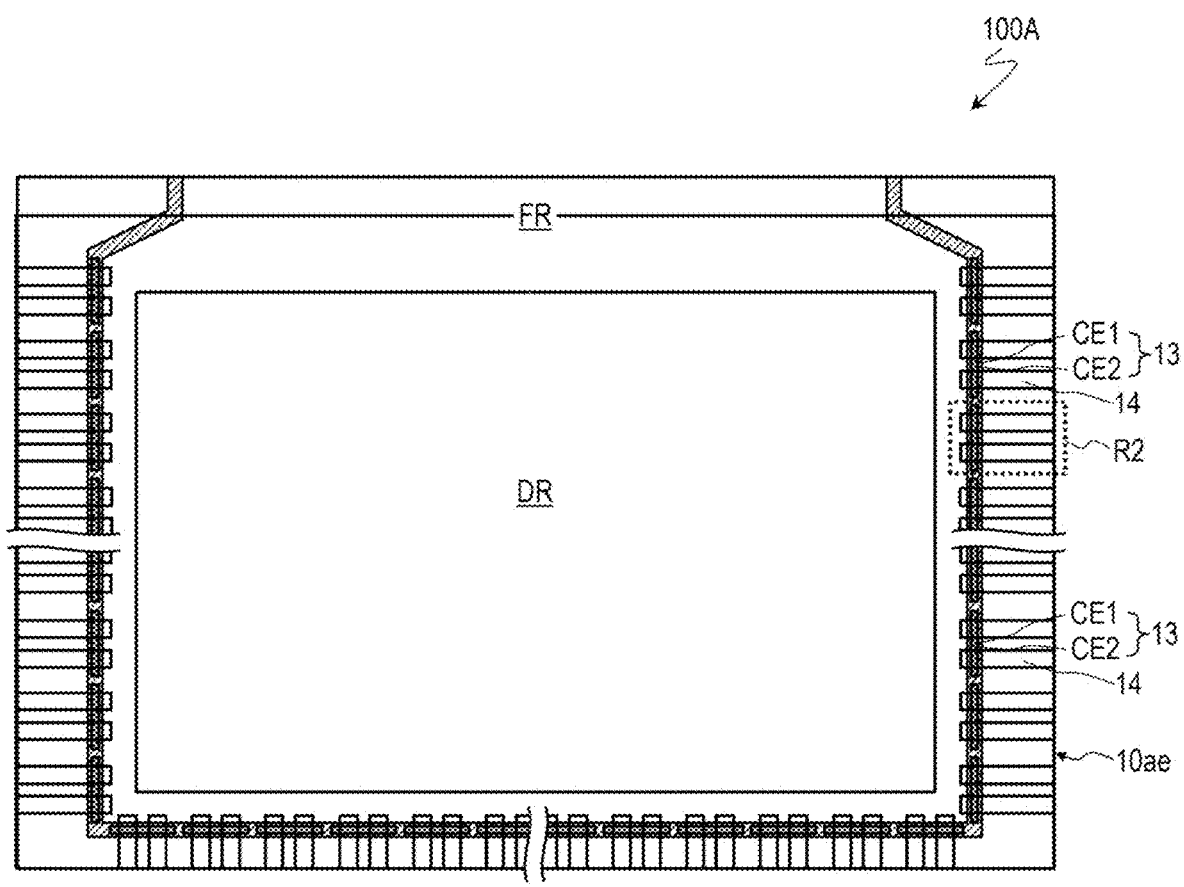
FIG. 9 is a plan view for describing the arrangement of the capacitance elements 13 and the transparent electrodes 14 included in the active matrix substrate 10 of the liquid crystal display device 100A.

Another liquid crystal display device 100A according to the present embodiment will be described with reference to FIGS. 8, 9, and 10. FIG. 8 is a cross-sectional view schematically illustrating the liquid crystal display device 100A. FIG. 9 is a plan view for describing the arrangement of the capacitance elements 13 and the transparent electrodes 14 in the liquid crystal display device 100A, and FIG. 10 is an enlarged view illustrating a portion (a region R2 surrounded by a dotted line) in FIG. 9.

Figure 10:
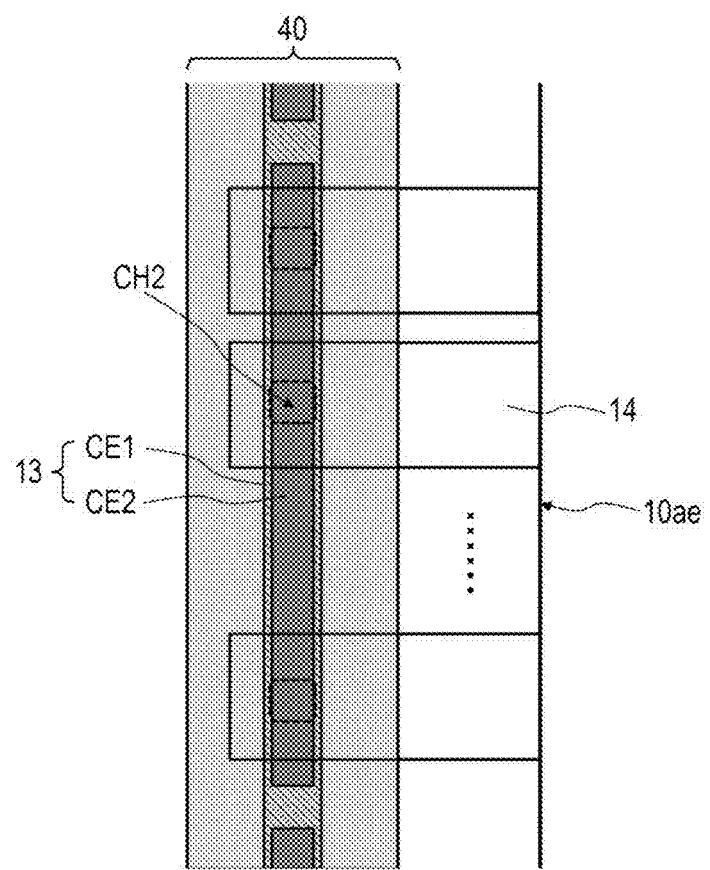
FIG. 10 is an enlarged view of a portion (a region R2 surrounded by a dotted line) in FIG. 9.

In the liquid crystal display device 100A illustrated in FIGS. 8, 9, and 10, each transparent electrode 14 extends to an end portion 10ae of the substrate 10a. This allows the static electricity to be attracted directly to the transparent electrode 14. This can further suppress display failure and the like caused by leakage.

Figure 11:
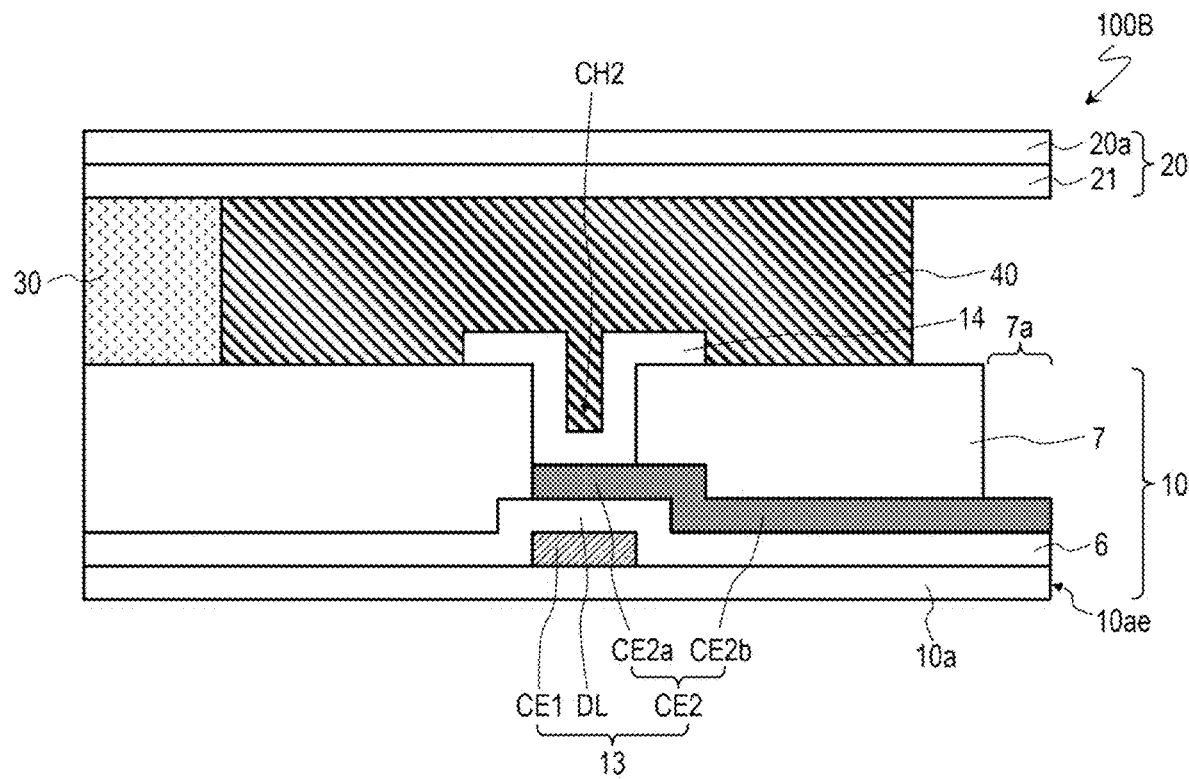
FIG. 11 is a cross-sectional view schematically illustrating yet another liquid crystal display device 100B according to an embodiment of the disclosure.
Figure 12:
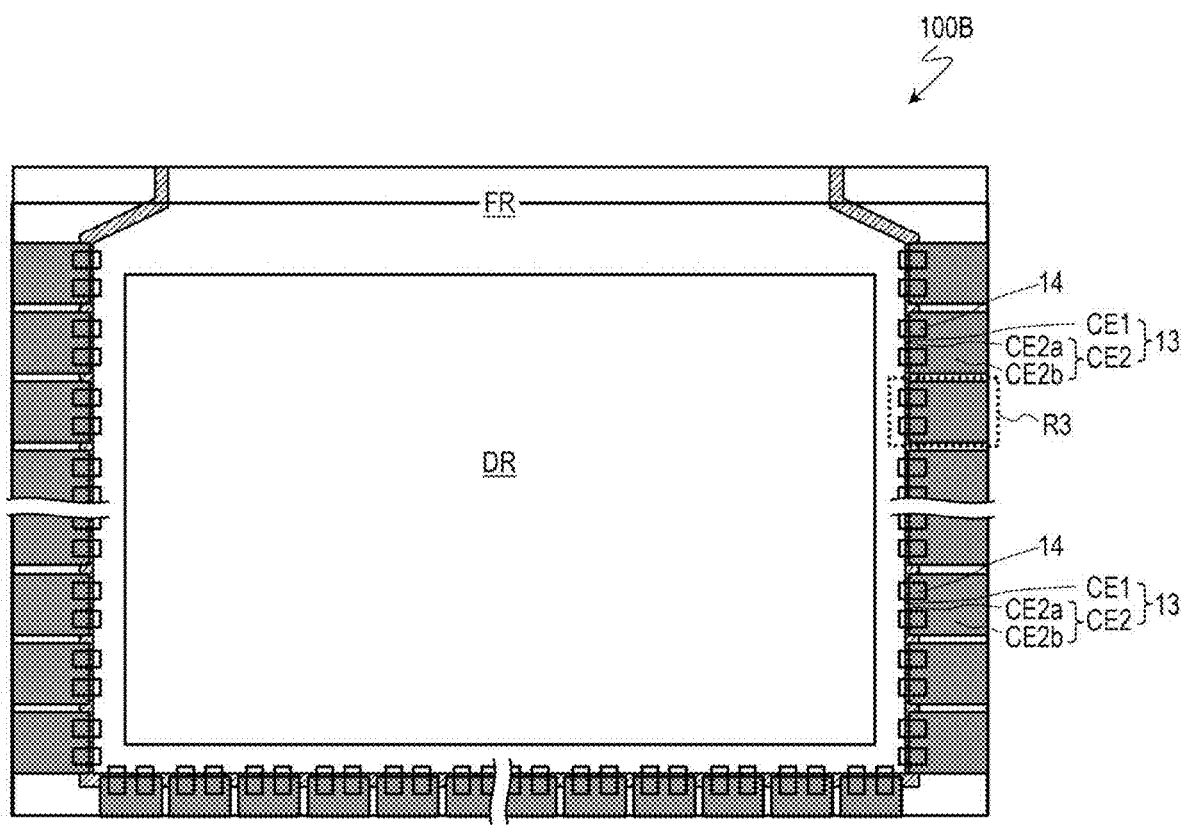
FIG. 12 is a plan view for describing the arrangement of the capacitance elements 13 and the transparent electrodes 14 included in the active matrix substrate 10 of the liquid crystal display device 100B.

Yet another liquid crystal display device 100B according to the present embodiment will be described with reference to FIGS. 11, 12, and 13. FIG. 11 is a cross-sectional view schematically illustrating the liquid crystal display device 100B. FIG. 12 is a plan view for describing the arrangement of the capacitance elements 13 and the transparent electrodes 14 in the liquid crystal display device 100B, and FIG. 13 is an enlarged view illustrating a portion (a region R3 surrounded by a dotted line) in FIG. 12.

Figure 13:
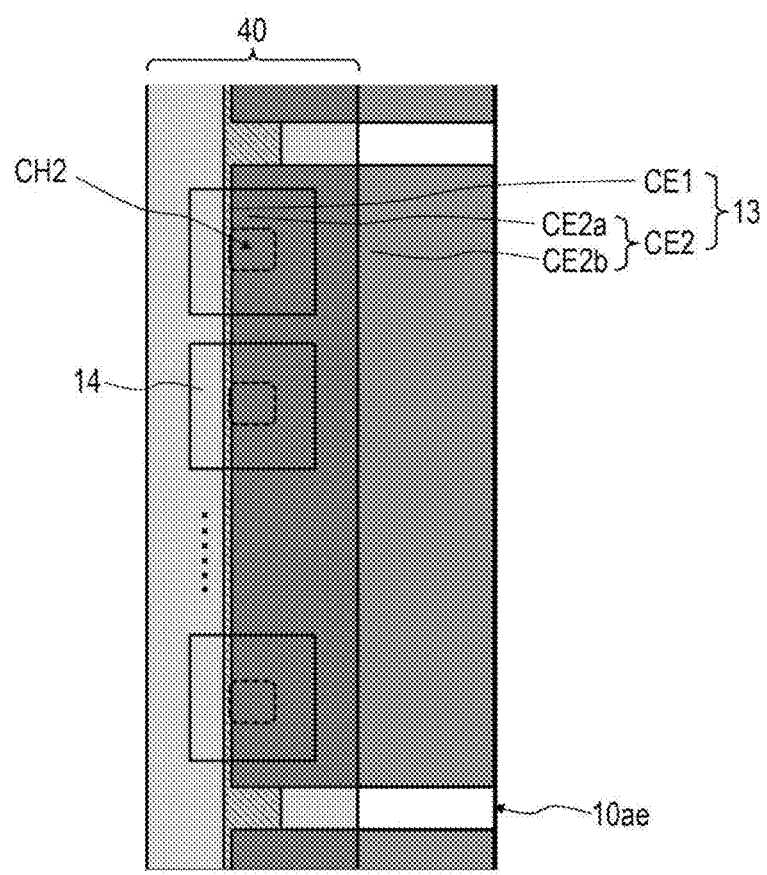
FIG. 13 is an enlarged view of a portion (a region R3 surrounded by a dotted line) in FIG. 12.

In the liquid crystal display device 100B illustrated in FIGS. 11, 12, and 13, the second capacitance electrode CE2 of the capacitance element 13 includes a body portion CE2a opposite the first capacitance electrode CE1 with the dielectric layer DL therebetween and an extending portion CE2b extending from the body portion CE2a to the end portion 10ae of the substrate 10a. Additionally, the interlayer insulating layer 7 is cut out near the end portion 10ae of the substrate 10a (that is, a notch portion 7a is formed).

In the liquid crystal display device 100B, the static electricity can be attracted directly to the second capacitance electrode CE2 due to the structure described above. This can further suppress display failure and the like caused by leakage.

Figure 14:
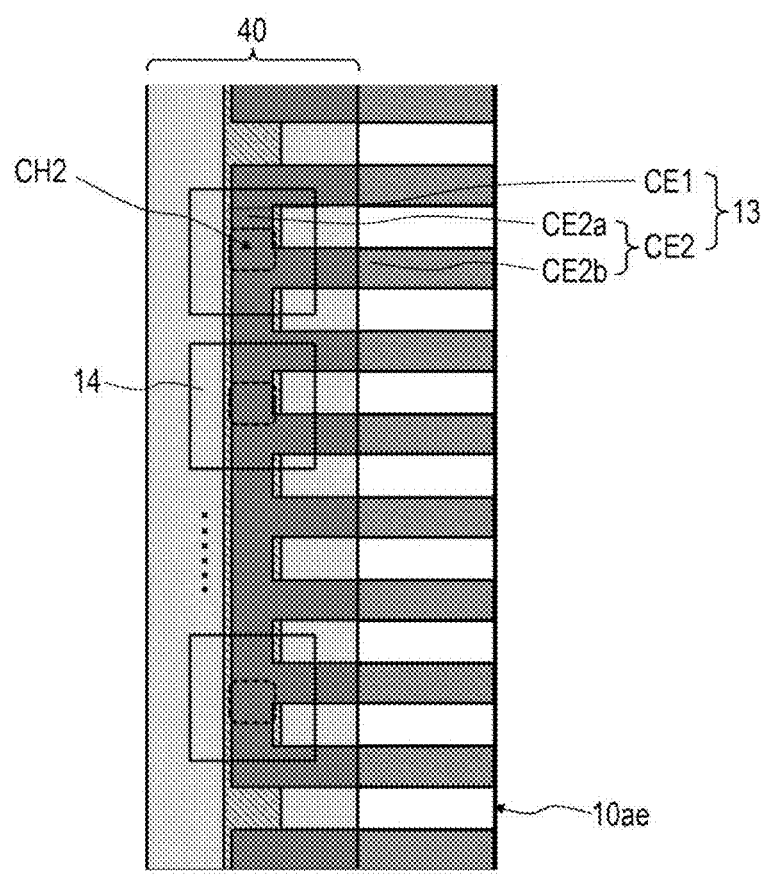
FIG. 14 is a view illustrating another example of an extending portion CE2b of a second capacitance electrode CE2.

Note that, as illustrated in FIG. 14, the extending portion CE2b of the second capacitance electrode CE2 may have a comb shape. In a case in which the sealing portion 40 is formed of a photosensitive resin material and the extending portion CE2b of the second capacitance electrode CE2 has a comb shape, photo-irradiation to the photosensitive resin material can be suitably performed when the sealing portion 40 is formed.

Second Embodiment

Figure 15:
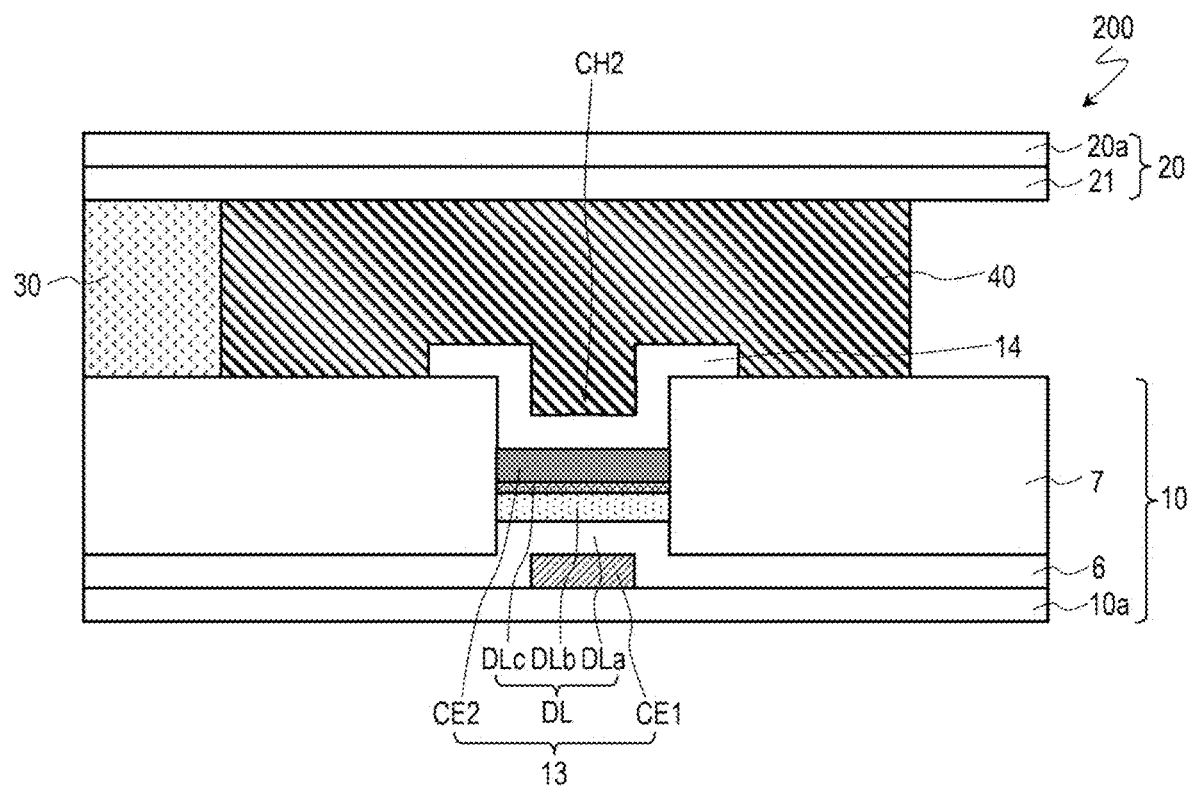
FIG. 15 is a cross-sectional view schematically illustrating yet another liquid crystal display device 200 according to an embodiment of the disclosure.

A liquid crystal display device 200 according to the present embodiment will be described with reference to FIG. 15. FIG. 15 is a cross-sectional view schematically illustrating the liquid crystal display device 200. The following description will primarily focus on differences between the liquid crystal display device 200 according to the present embodiment and the liquid crystal display device 100 of the first embodiment.

The liquid crystal display device 200 differs from the liquid crystal display device 100 of the first embodiment in that the dielectric layer DL of the capacitance element 13 has a layered structure. As illustrated in FIG. 15, the dielectric layer DL includes a first layer DLa, a second layer DLb, and a third layer DLc. The first layer DLa, the second layer DLb, and the third layer DLc are layered in this order from the first capacitance electrode CE1 side.

The first layer DLa is formed in the same layer as the gate insulating layer 6 of the TFT 1. In the illustrated example, the gate insulating layer 6 is formed on substantially the entire surface of the substrate 10a (in other words, extends also in a region other than the TFT 1), and a portion of the gate insulating layer 6 is the first layer DLa.

The second layer DLb is formed in the same layer as the intrinsic semiconductor layer 2a of the TFT 1, and is a layer formed of an intrinsic semiconductor. The third layer DLc is formed in the same layer as the doped semiconductor layer 2b of the TFT 1, and is a layer formed of a doped semiconductor.

Also in the liquid crystal display device 200 according to the present embodiment, the active matrix substrate 10 includes the capacitance element 13 and the transparent electrode 14. Thus, when an ESD occurs, the static electricity entering from the outside can be attracted to the transparent electrode 14 to charge the capacitance element 13. Accordingly, the impact of an ESD can be absorbed, and entrance of static electricity into the GOA circuit 12 and the display region DR can be suppressed. Thus, display failure and lighting failure caused by leakage due to an ESD are suppressed.

Additionally, in the liquid crystal display device 200 according to the present embodiment, since the dielectric layer DL of the capacitance element 13 has such a layered structure described above, even in a case in which there is a forming failure in the second capacitance electrode CE2, the second layer DLb and the third layer DLc function as an etching stopper when the contact hole CH2 is formed. This can prevent the first layer DLa from being also removed (the capacitance element 13 is not to be formed).

Figure 16:
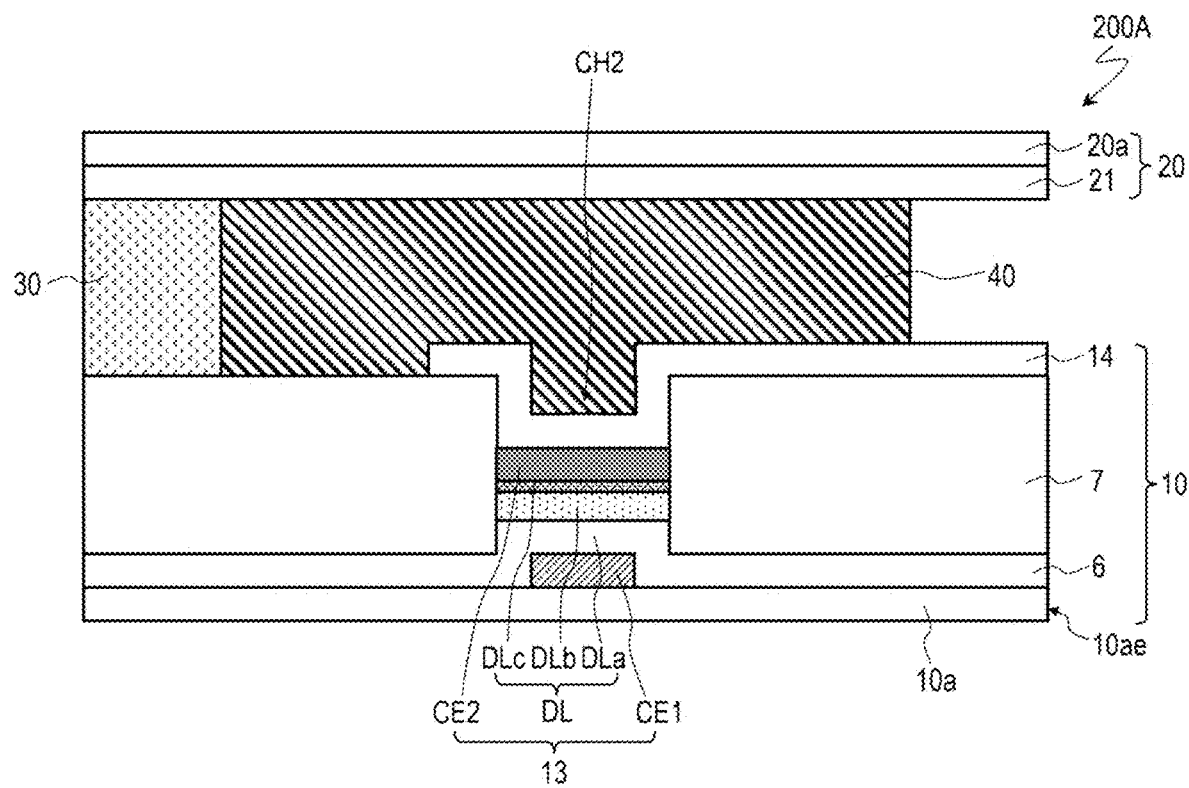
FIG. 16 is a cross-sectional view schematically illustrating yet another liquid crystal display device 200A according to an embodiment of the disclosure.

FIG. 16 illustrates another liquid crystal display device 200A according to the present embodiment. In the liquid crystal display device 200A illustrated in FIG. 16, the transparent electrode 14 extends to the end portion 10ae of the substrate 10a. This allows the static electricity to be attracted directly to the transparent electrode 14. This can further suppress display failure and the like caused by leakage.

Figure 17:
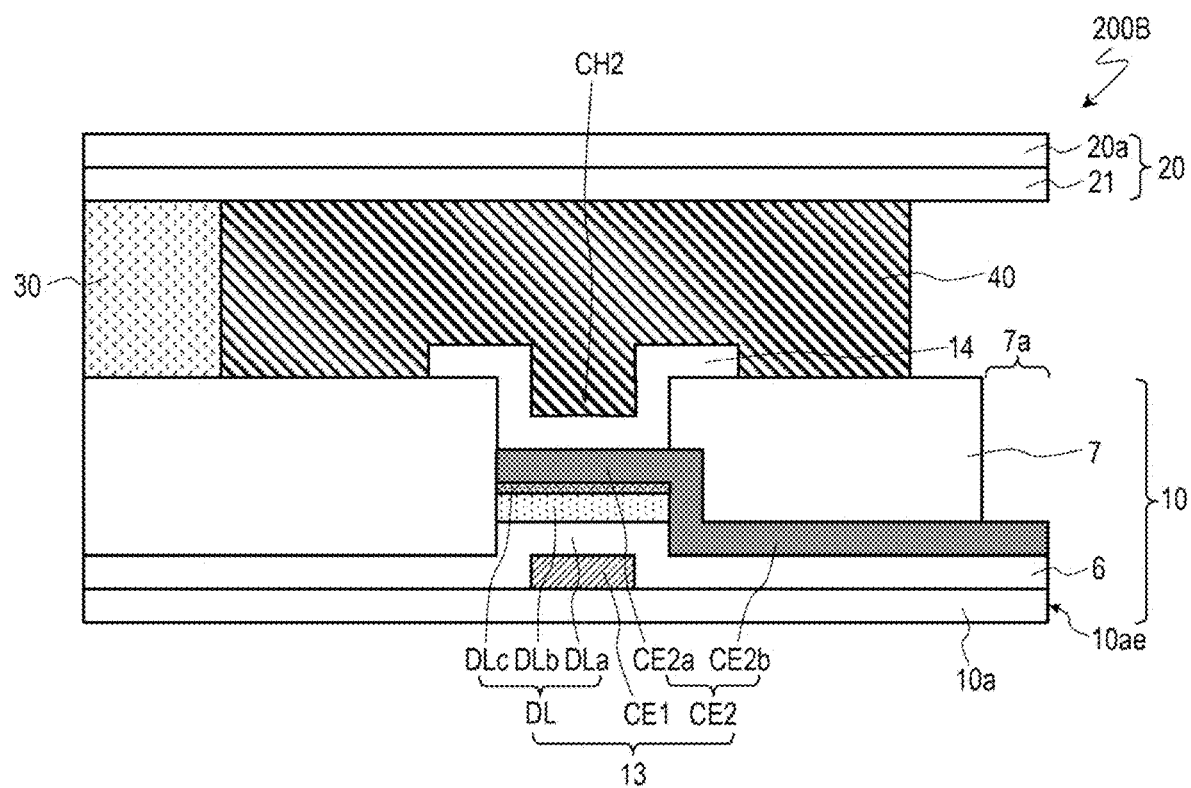
FIG. 17 is a cross-sectional view schematically illustrating yet another liquid crystal display device 200B according to an embodiment of the disclosure.

FIG. 17 illustrates yet another liquid crystal display device 200B according to the present embodiment. In the liquid crystal display device 200B illustrated in FIG. 17, the second capacitance electrode CE2 of the capacitance element 13 includes the body portion CE2a opposite the first capacitance electrode CE1 with the dielectric layer DL therebetween and the extending portion CE2b extending from the body portion CE2a to the end portion 10ae of the substrate 10a. Additionally, the interlayer insulating layer 7 is cut out near the end portion 10ae of the substrate 10a (that is, a notch portion 7a is formed).

In the liquid crystal display device 200B, the static electricity can be attracted directly to the second capacitance electrode CE2 due to the structure described above. This can further suppress display failure and the like caused by leakage.

Note that, as in the structure illustrated in FIG. 14, the extending portion CE2b of the second capacitance electrode CE2 may have a comb shape. In a case in which the sealing portion 40 is formed of a photosensitive resin material and the extending portion CE2b of the second capacitance electrode CE2 has a comb shape, photo-irradiation to the photosensitive resin material can be suitably performed when the sealing portion 40 is formed.

Third Embodiment

Figure 18:
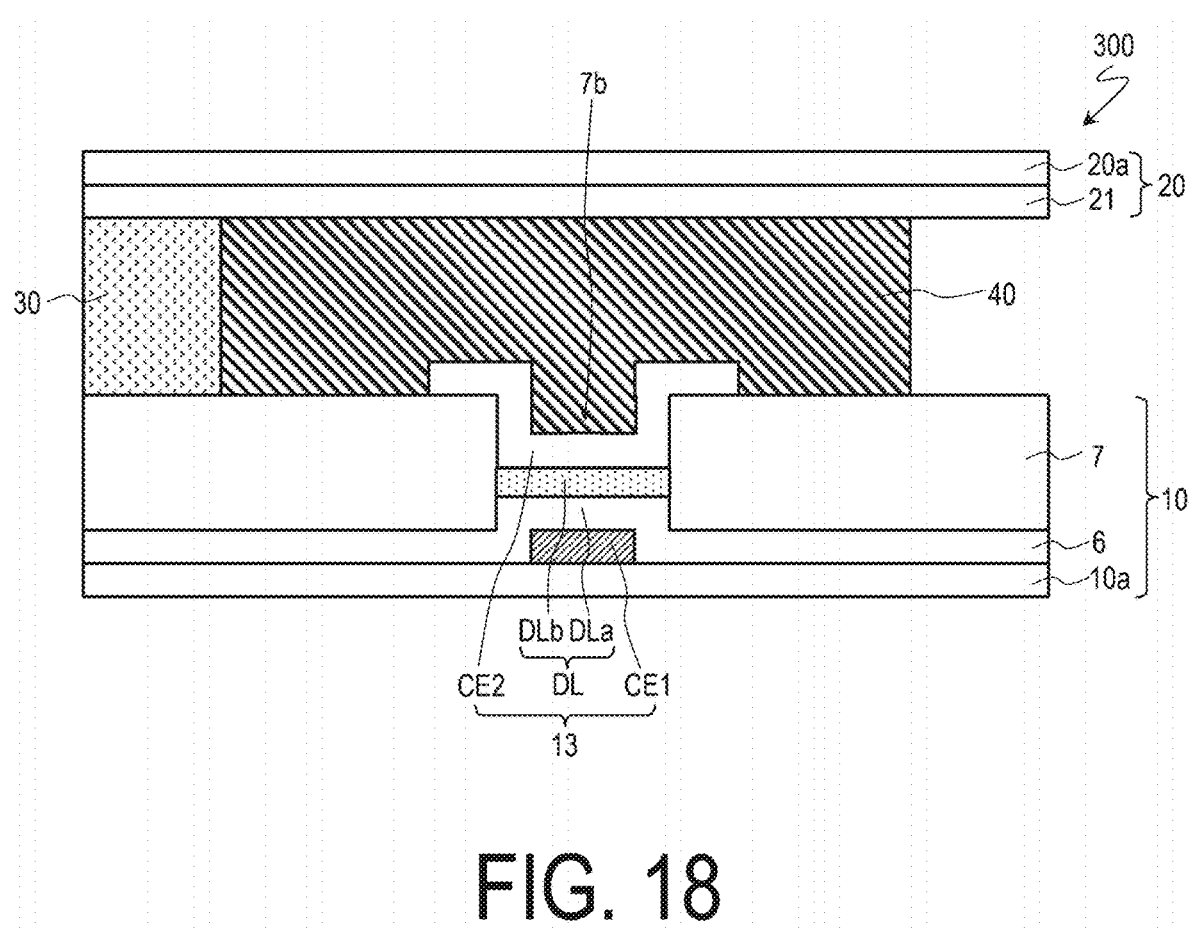
FIG. 18 is a cross-sectional view schematically illustrating yet another liquid crystal display device 300 according to an embodiment of the disclosure.
Figure 19:
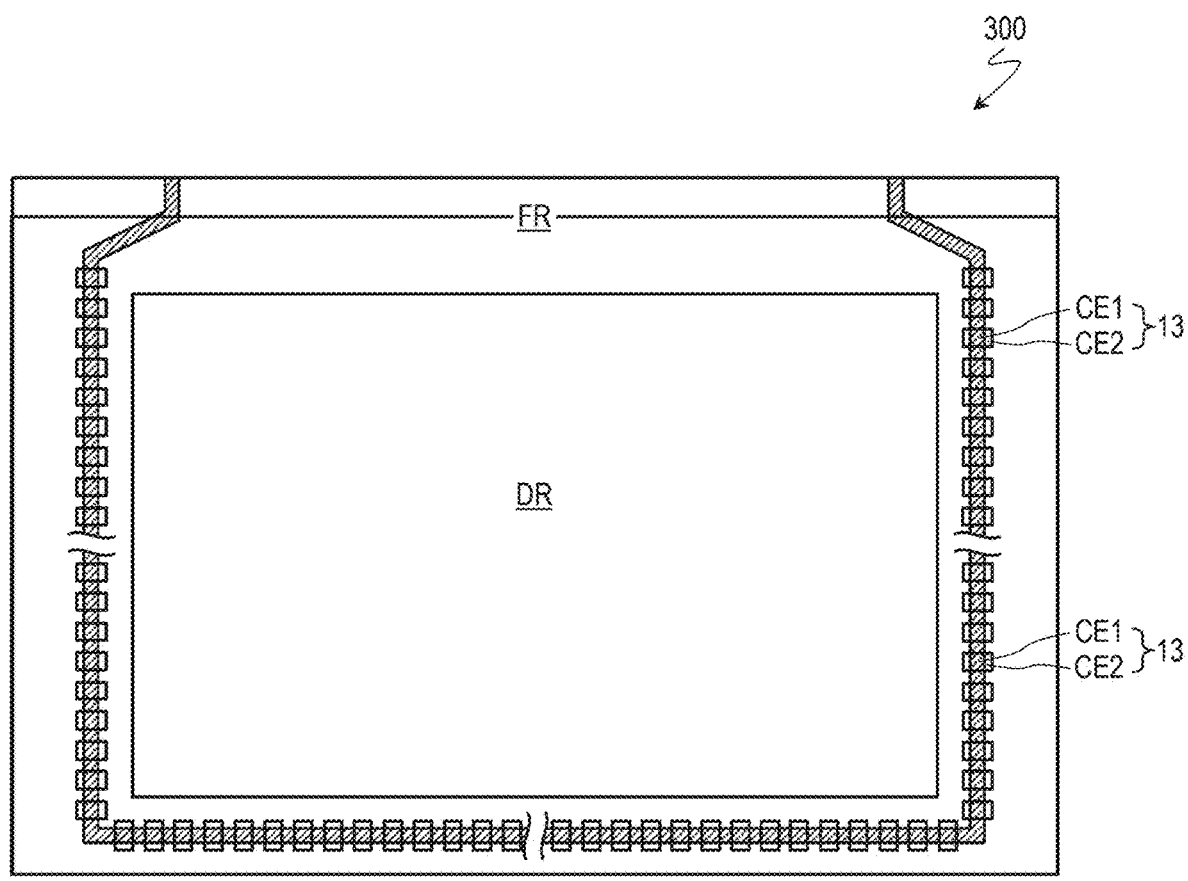
FIG. 19 is a plan view for describing the arrangement of the capacitance elements 13 included in the active matrix substrate 10 of the liquid crystal display device 300.

A liquid crystal display device 300 according to the present embodiment will be described with reference to FIGS. 18 and 19. FIG. 18 is a cross-sectional view schematically illustrating the liquid crystal display device 300. FIG. 19 is a plan view for describing the arrangement of the capacitance elements 13 in the liquid crystal display device 300. The following description will primarily focus on differences between the liquid crystal display device 300 according to the present embodiment and the liquid crystal display device 100 of the first embodiment.

Also in the liquid crystal display device 300 according to the present embodiment, as illustrated in FIG. 18, the active matrix substrate 10 includes the capacitance element 13 provided at least partially overlapping (in the illustrated example, entirely overlapping) the sealing portion 40 when seen from a direction normal to a display surface. The capacitance element 13 includes the first capacitance electrode CE1, the second capacitance electrode CE2, and the dielectric layer DL. In the present embodiment, as illustrated in FIG. 19, the plurality of capacitance elements 13 are provided in the peripheral region FR.

The first capacitance electrode CE1 is formed in the same layer as the gate electrode 3 of the TFT 1. That is, the first capacitance electrode CE1 is formed by patterning a conductive film (gate metal film) used to form the gate electrode 3; thus, the first capacitance electrode CE1 is formed by the same process as the gate electrode 3. A direct current signal (for example, a COM potential or a GND potential) is supplied to the first capacitance electrode CE1.

The second capacitance electrode CE2 is disposed opposite the first capacitance electrode CE1 and between the first capacitance electrode CE1 and the sealing portion 40. The second capacitance electrode CE2 is formed of a transparent conductive material (an indium tin oxide or an indium zinc oxide, for example). In the present embodiment, the second capacitance electrode CE2 is formed in the same layer as the pixel electrode 11. That is, the second capacitance electrode CE2 is formed by patterning a transparent conductive film used to form the pixel electrode 11; thus, the second capacitance electrode CE2 is formed by the same process as the pixel electrode 11. The upper surface of the second capacitance electrode CE2 is in contact with the sealing portion 40.

The dielectric layer DL is located between the first capacitance electrode CE1 and the second capacitance electrode CE2. In the present embodiment, the dielectric layer DL has a layered structure. The dielectric layer DL includes the first layer DLa and the second layer DLb. The first layer DLa and the second layer DLb are layered in this order from the first capacitance electrode CE1 side.

The first layer DLa is formed in the same layer as the gate insulating layer 6 of the TFT 1. In the illustrated example, the gate insulating layer 6 is formed on substantially the entire surface of the substrate 10a (in other words, extends also in a region other than the TFT 1), and a portion of the gate insulating layer 6 is the first layer DLa. The second layer DLb is formed in the same layer as the intrinsic semiconductor layer 2a of the TFT 1, and is a layer formed of an intrinsic semiconductor.

An opening 7b where the second layer DLb is exposed is formed in the interlayer insulating layer 7. At least a portion of the second capacitance electrode CE2 is located in the opening 7b and is in contact with the second layer DLb.

In the illustrated example, in the peripheral region FR, the first capacitance electrodes CE1 of all the capacitance elements 13 are formed continuous with each other, and the first capacitance electrode layer is routed in the peripheral region FR, as a wiring line which a direct current signal is applied to. Also, the second capacitance electrodes CE2 of the capacitance elements 13 are formed separated from each other. That is, the second capacitance electrode layer can be said to be divided (subdivided) into a plurality of portions.

In this manner, in the liquid crystal display device 300 according to this embodiment, the electrode formed of the transparent conductive material functions as the second capacitance electrode CE2. In the liquid crystal display device 300, the active matrix substrate 10 includes the capacitance element 13 with the structure described above. Thus, when an ESD occurs, the static electricity entering from the outside can be attracted to the second capacitance electrode CE2 to charge the capacitance element 13. Accordingly, the impact of an ESD can be absorbed, and entrance of static electricity into the GOA circuit 12 and the display region DR can be suppressed. Thus, display failure and lighting failure caused by leakage due to an ESD are suppressed.

Additionally, in the liquid crystal display device 300 according to the present embodiment, since the dielectric layer DL of the capacitance element 13 has such a layered structure described above, the second layer DLb functions as an etching stopper when the opening 7b is formed. This can prevent the first layer DLa from being also completely removed (the capacitance element 13 is not to be formed). Note that when the opening 7b is formed, the second layer DLb may be completely removed or the thickness of the first layer DLa may be slightly reduced.

Figure 20:
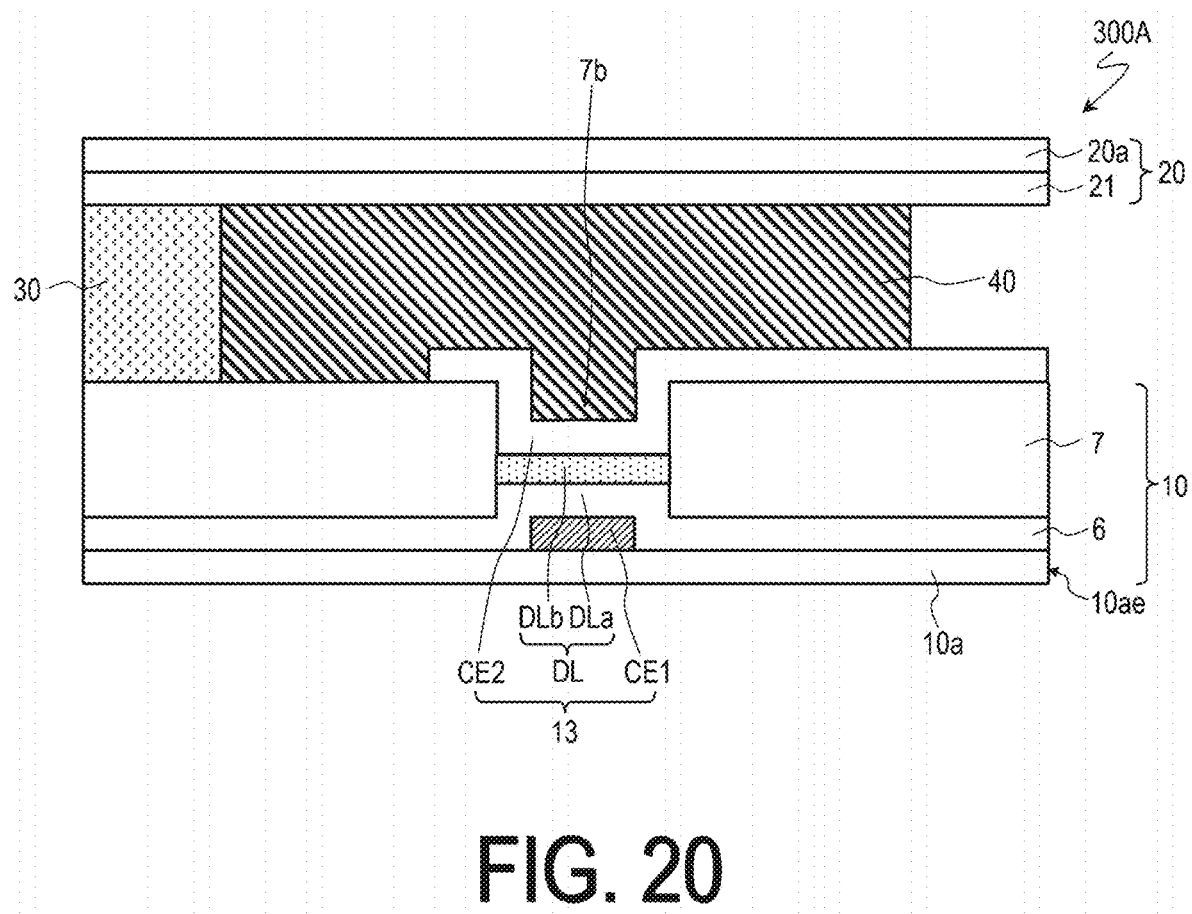
FIG. 20 is a cross-sectional view schematically illustrating yet another liquid crystal display device 300A according to an embodiment of the disclosure.

FIG. 20 illustrates another liquid crystal display device 300A according to the present embodiment. In the liquid crystal display device 300A illustrated in FIG. 20, the second capacitance electrode CE2 extends to the end portion 10ae of the substrate 10a. This allows the static electricity to be attracted directly to the second capacitance electrode CE2. This can further suppress display failure and the like caused by leakage.

Note that in the example illustrated in FIG. 19, the second capacitance electrode layer is divided into a plurality of portions. However, the second capacitance electrode layer need not be divided. In a case in which the second capacitance electrode layer is not divided, one capacitance element 13 is provided in the entire peripheral region FR. As illustrated in FIG. 19, the second capacitance electrode layer is divided into a plurality of portions (in other words, the second capacitance electrodes CE2 are formed separated from each other), and thus it is possible to suppress a decrease in the adhesive strength of the sealing portion 40.

Fourth Embodiment

Figure 21:
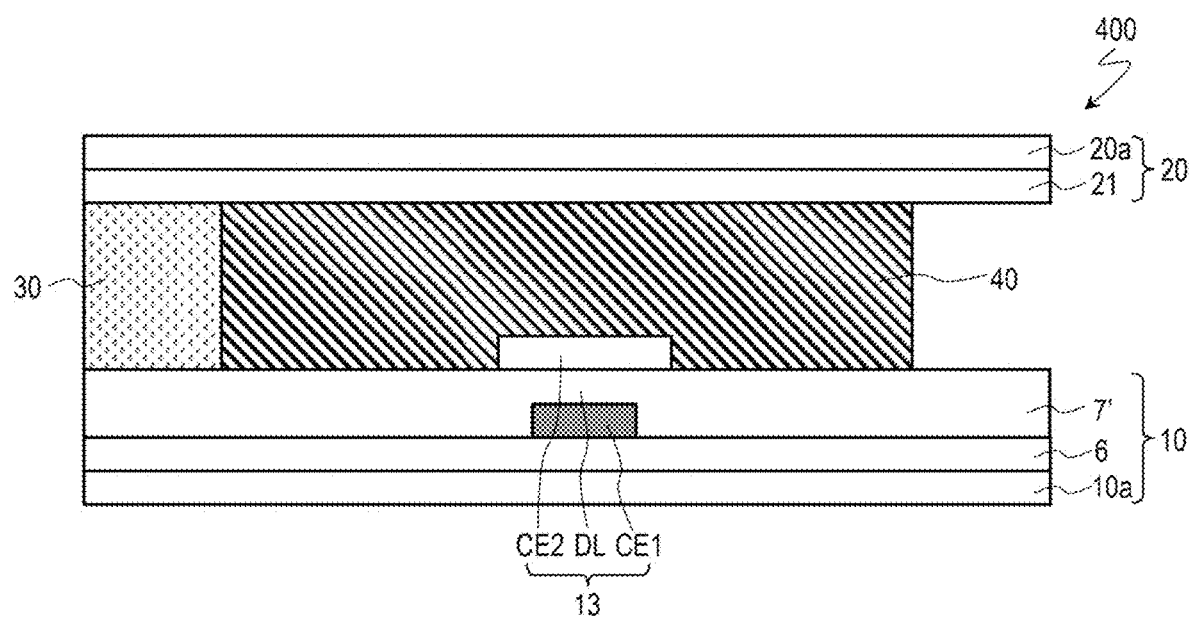
FIG. 21 is a cross-sectional view schematically illustrating yet another liquid crystal display device 400 according to an embodiment of the disclosure.
Figure 22:
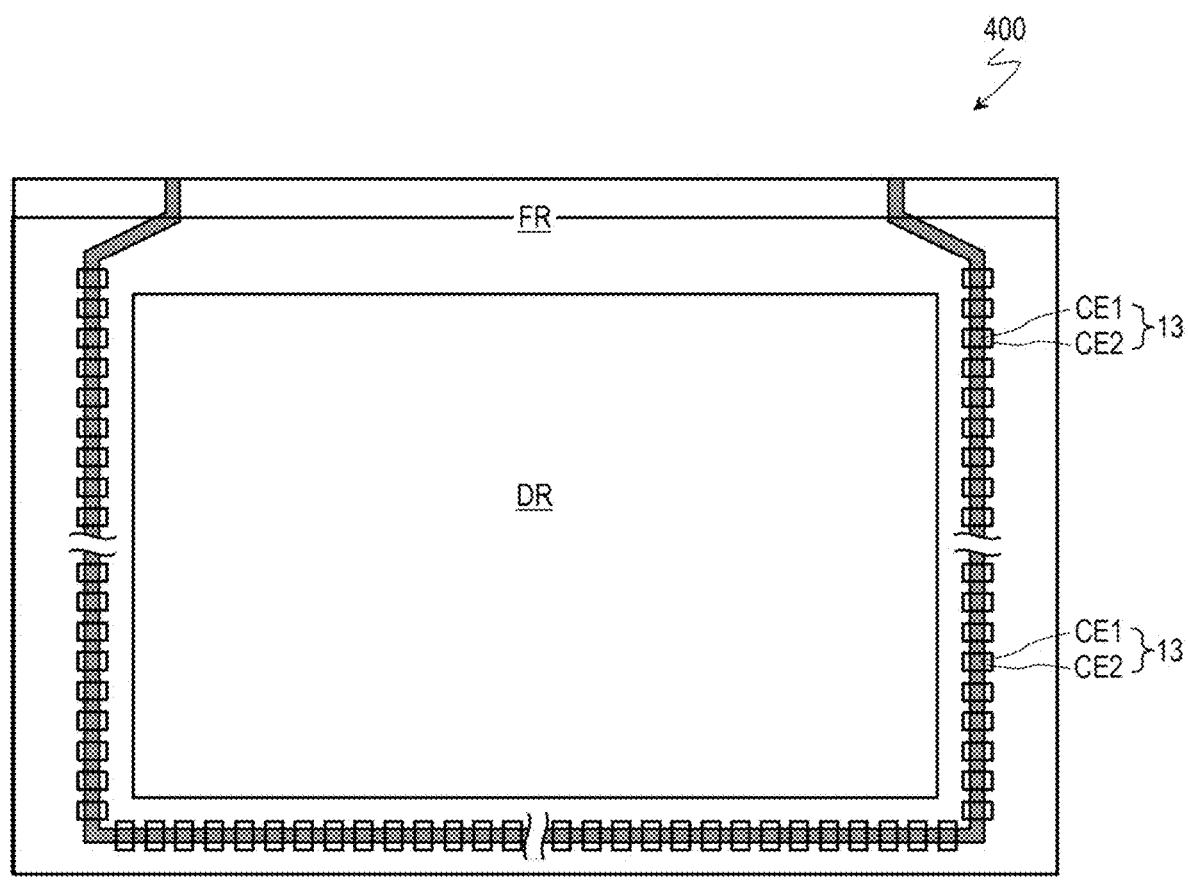
FIG. 22 is a plan view for describing the arrangement of the capacitance elements 13 included in the active matrix substrate 10 of the liquid crystal display device 400.

A liquid crystal display device 400 according to the present embodiment will be described with reference to FIGS. 21 and 22. FIG. 21 is a cross-sectional view schematically illustrating the liquid crystal display device 400. FIG. 22 is a plan view for describing the arrangement of the capacitance elements 13 in the liquid crystal display device 400. The following description will primarily focus on differences between the liquid crystal display device 400 according to the present embodiment and the liquid crystal display device 300 of the third embodiment.

The liquid crystal display device 400 of the present embodiment differs from the liquid crystal display device 300 of the third embodiment in that the first capacitance electrode CE1 of the capacitance element 13 is formed in the same layer as the source electrode 4 and the drain electrode 5 of the TFT 1. The second capacitance electrode CE2 is formed in the same layer as the pixel electrode 11 as in the second capacitance electrode CE2 of the liquid crystal display device 300 of the third embodiment.

Also, in the present embodiment, an interlayer insulating layer 7' is an inorganic insulating layer and does not include an organic insulating layer. That is, the interlayer insulating layer 7' has a structure in which the organic insulating layer 9 is omitted from the interlayer insulating layer 7 illustrated in FIG. 3, and is thinner than the interlayer insulating layer 7 having a layered structure.

In the present embodiment, the interlayer insulating layer 7' located between the first capacitance electrode CE1 and the second capacitance electrode CE2 functions as the dielectric layer DL of the capacitance element 13.

In the illustrated example, in the peripheral region FR, the first capacitance electrodes CE1 of all the capacitance elements 13 are formed continuous with each other, and the first capacitance electrode layer is routed in the peripheral region FR, as a wiring line which a direct current signal is applied to. Also, the second capacitance electrodes CE2 of the capacitance elements 13 are formed separated from each other. That is, the second capacitance electrode layer can be said to be divided (subdivided) into a plurality of portions.

In the liquid crystal display device 400 of the present embodiment, as in the liquid crystal display device 300 of the third embodiment, when an ESD occurs, the static electricity entering from the outside can be attracted to the second capacitance electrode CE2 to charge the capacitance element 13, suppressing entrance of the static electricity into the GOA circuit 12 and the display region DR.

Note that in the example illustrated in FIG. 22, the second capacitance electrode layer is divided into a plurality of portions. However, the second capacitance electrode layer need not be divided. In a case in which the second capacitance electrode layer is not divided, one capacitance element 13 is provided in the entire peripheral region FR. As illustrated in FIG. 22, the second capacitance electrode layer is divided into a plurality of portions (in other words, the second capacitance electrodes CE2 are formed separated from each other), and thus it is possible to suppress a decrease in the adhesive strength of the sealing portion 40.

Figure 23:
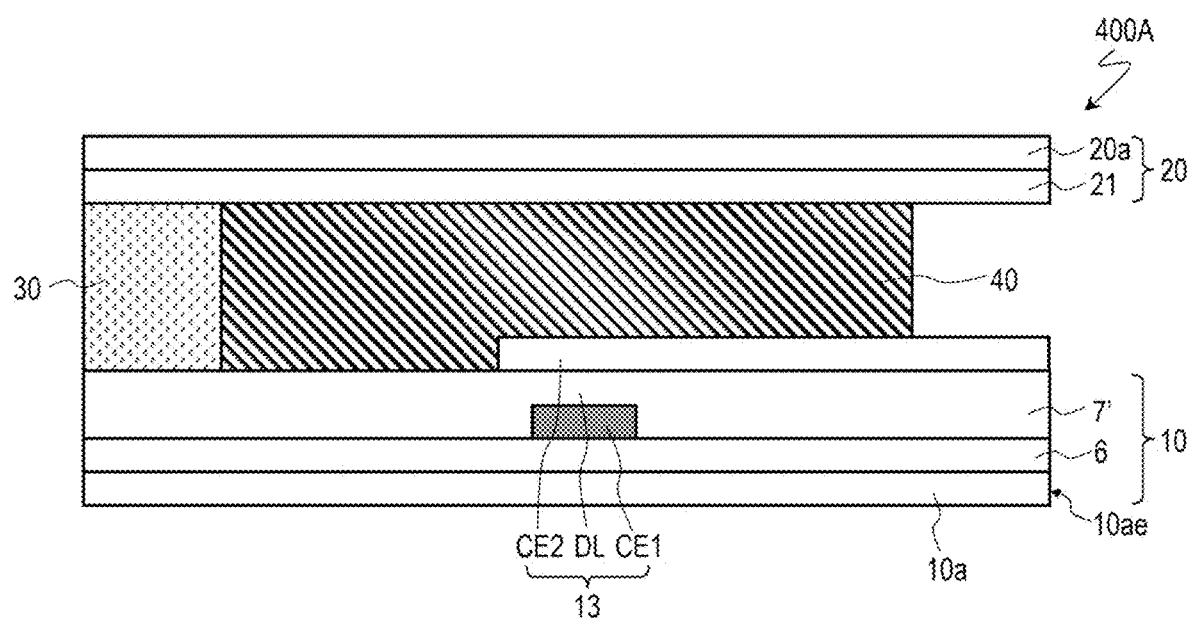
FIG. 23 is a cross-sectional view schematically illustrating yet another liquid crystal display device 400A according to an embodiment of the disclosure.

FIG. 23 illustrates another liquid crystal display device 400A according to the present embodiment. In the liquid crystal display device 400A illustrated in FIG. 23, the second capacitance electrode CE2 extends to the end portion 10ae of the substrate 10a. This allows the static electricity to be attracted directly to the second capacitance electrode CE2. This can further suppress display failure and the like caused by leakage.

Fifth Embodiment

Figure 24:
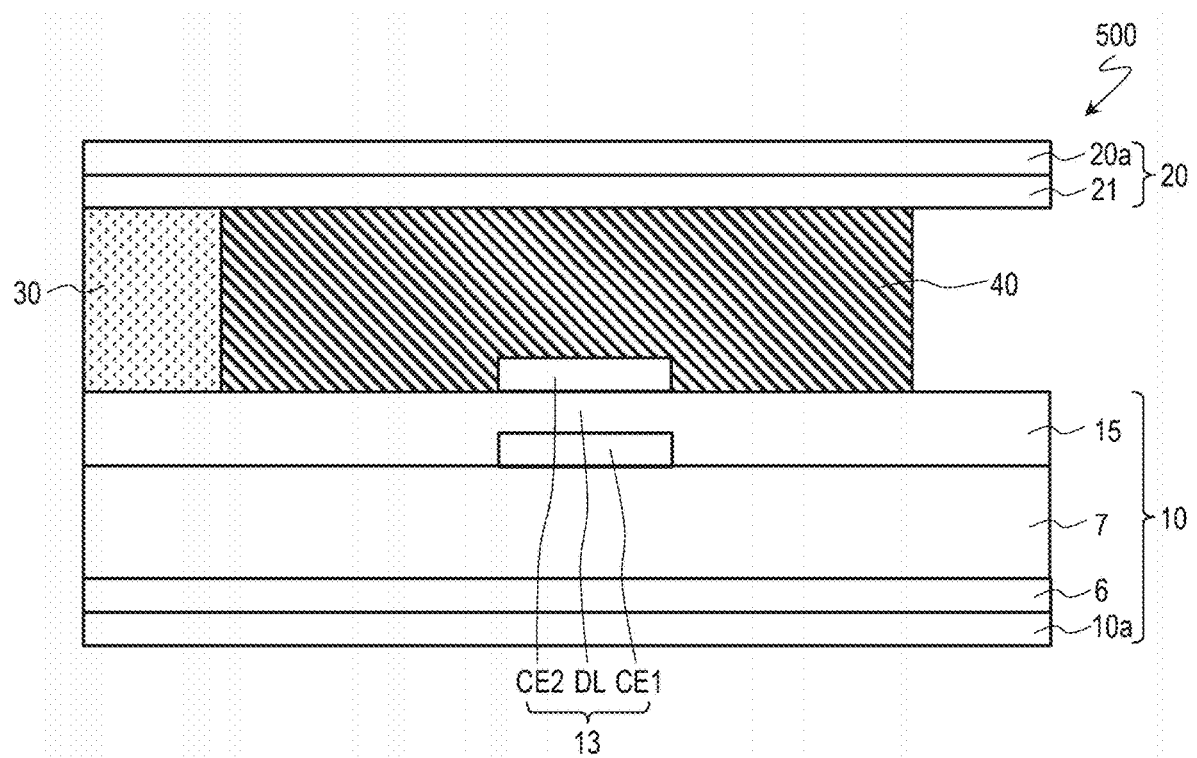
FIG. 24 is a cross-sectional view schematically illustrating yet another liquid crystal display device 500 according to an embodiment of the disclosure.
Figure 25:
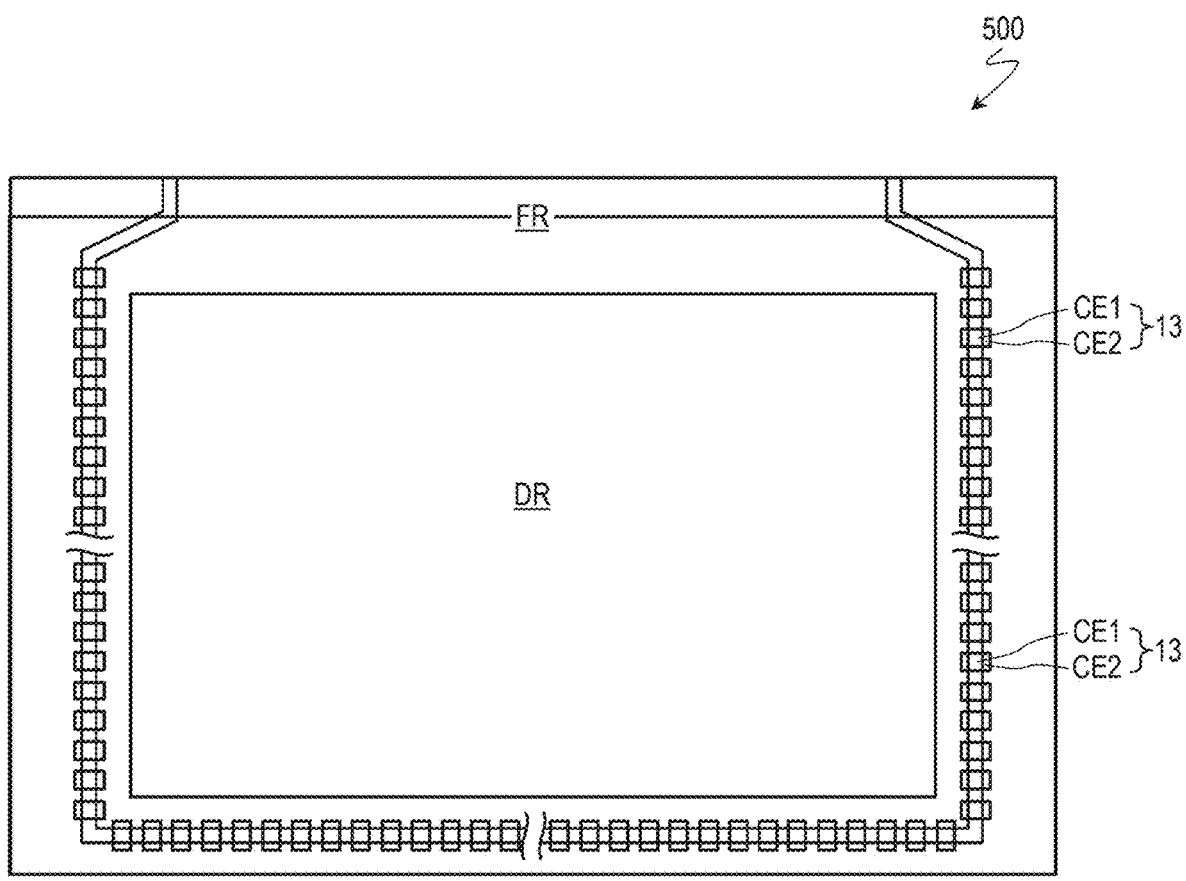
FIG. 25 is a plan view for describing the arrangement of the capacitance elements 13 included in the active matrix substrate 10 of the liquid crystal display device 500.

A liquid crystal display device 500 according to the present embodiment will be described with reference to FIGS. 24 and 25. FIG. 24 is a cross-sectional view schematically illustrating the liquid crystal display device 500. FIG. 25 is a plan view for describing the arrangement of the capacitance elements 13 in the liquid crystal display device 500. The following description will primarily focus on differences between the liquid crystal display device 500 according to the present embodiment and the liquid crystal display device 300 of the third embodiment.

In the liquid crystal display device 500 of the present embodiment, not only is the second capacitance electrode CE2 of the capacitance element 13 formed of a transparent conductive material, but the first capacitance electrode CE1 is also formed of a transparent conductive material (an indium tin oxide or an indium zinc oxide, for example). A direct current signal (for example, a COM potential or a GND potential) is supplied to the first capacitance electrode CE1. As illustrated in FIG. 24, the first capacitance electrode CE1 is provided on the interlayer insulating layer 7, and an interlayer insulating layer 15 is further formed covering the first capacitance electrode CE1. Hereinafter, the interlayer insulating layer 7 is referred to as a "first interlayer insulating layer", and the interlayer insulating layer 15 is referred to as a "second interlayer insulating layer".

In this example, the second interlayer insulating layer 15 is an organic insulating layer formed of a photosensitive resin material. The second capacitance electrode CE2 is provided on the second interlayer insulating layer 15. Also, in the present embodiment, the pixel electrode 11 is provided on the second interlayer insulating layer 15, and the second capacitance electrode CE2 is formed in the same layer as the pixel electrode 11.

In the present embodiment, the second interlayer insulating layer 15 located between the first capacitance electrode CE1 and the second capacitance electrode CE2 functions as the dielectric layer DL of the capacitance element 13.

In the illustrated example, in the peripheral region FR, the first capacitance electrodes CE1 of all the capacitance elements 13 are formed continuous with each other, and the first capacitance electrode layer is routed in the peripheral region FR, as a wiring line which a direct current signal is applied to. Also, the second capacitance electrodes CE2 of the capacitance elements 13 are formed separated from each other. That is, the second capacitance electrode layer can be said to be divided (subdivided) into a plurality of portions.

In the liquid crystal display device 500 of the present embodiment, as in the liquid crystal display device 300 of the third embodiment, when an ESD occurs, the static electricity entering from the outside can be attracted to the second capacitance electrode CE2 to charge the capacitance element 13, suppressing entrance of the static electricity into the GOA circuit 12 and the display region DR.

Note that in the example illustrated in FIG. 25, the second capacitance electrode layer is divided into a plurality of portions. However, the second capacitance electrode layer need not be divided. In a case in which the second capacitance electrode layer is not divided, one capacitance element 13 is provided in the entire peripheral region FR. As illustrated in FIG. 25, the second capacitance electrode layer is divided into a plurality of portions (in other words, the second capacitance electrodes CE2 are formed separated from each other), and thus it is possible to suppress a decrease in the adhesive strength of the sealing portion 40.

Figure 26:
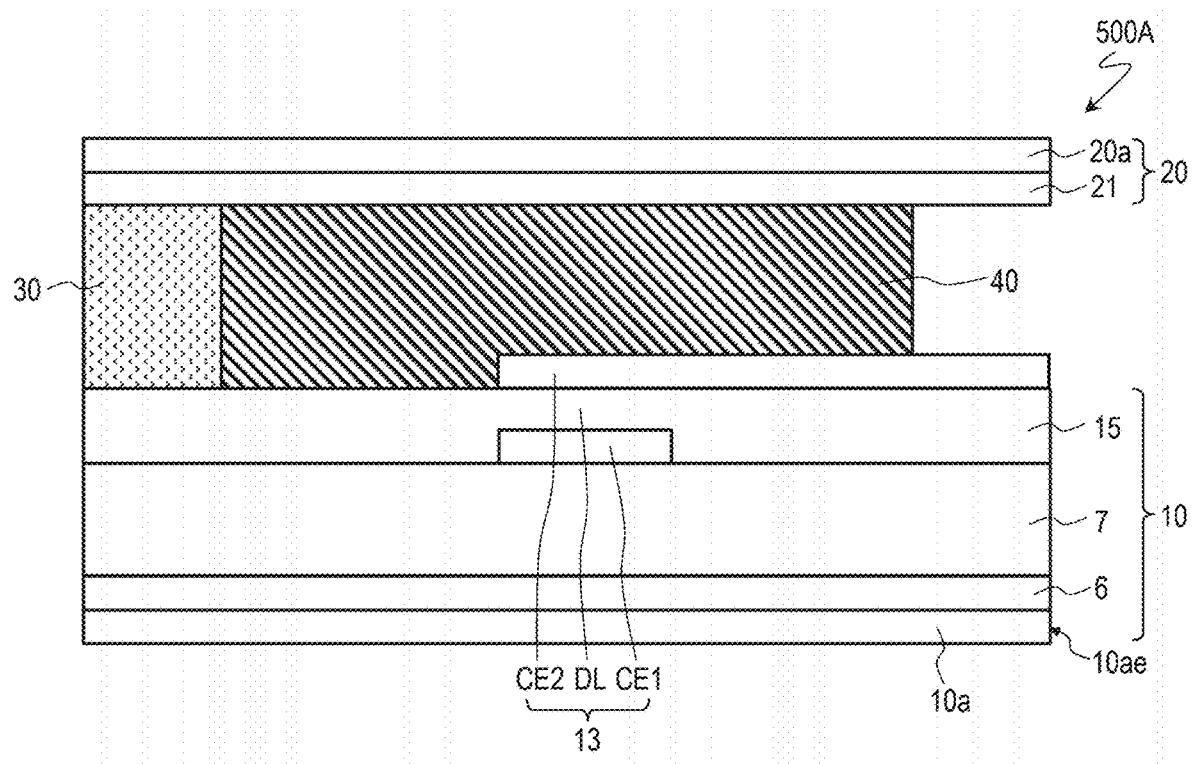
FIG. 26 is a cross-sectional view schematically illustrating yet another liquid crystal display device 500A according to an embodiment of the disclosure.

FIG. 26 illustrates another liquid crystal display device 500A according to the present embodiment. In the liquid crystal display device 500A illustrated in FIG. 26, the second capacitance electrode CE2 extends to the end portion 10ae of the substrate 10a. This allows the static electricity to be attracted directly to the second capacitance electrode CE2. This can further suppress display failure and the like caused by leakage.

Figure 27:
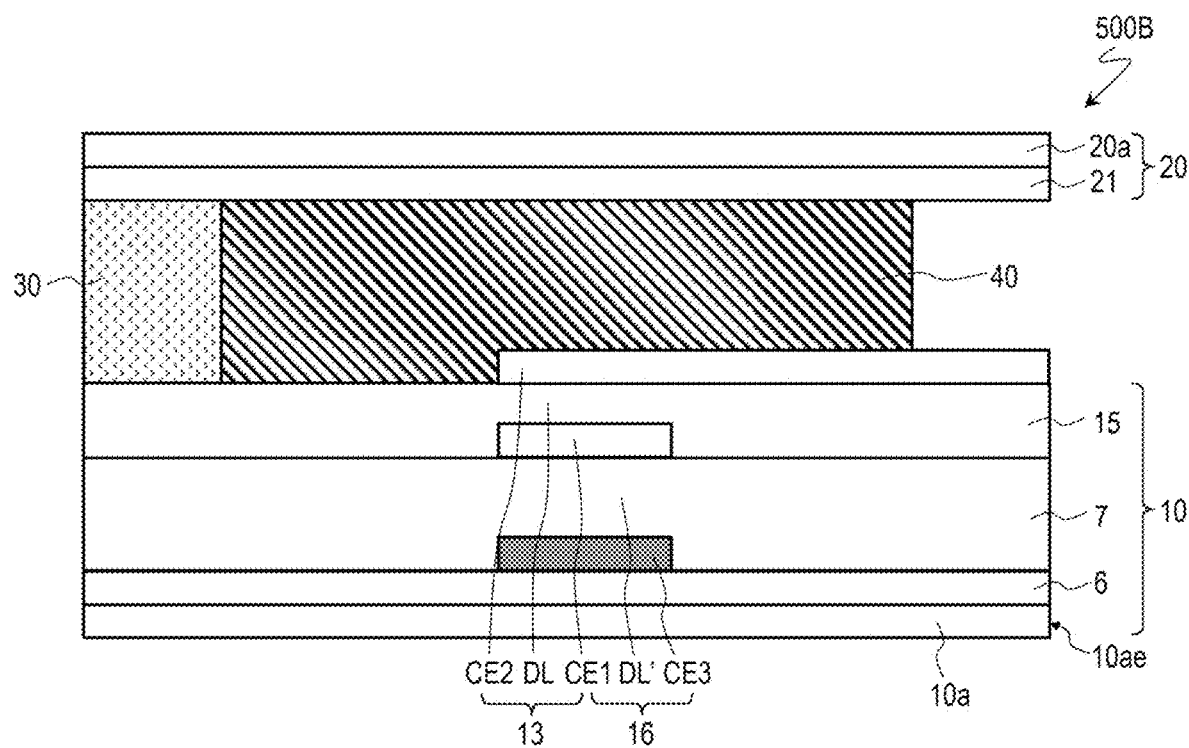
FIG. 27 is a cross-sectional view schematically illustrating yet another liquid crystal display device 500B according to an embodiment of the disclosure.

FIG. 27 illustrates yet another liquid crystal display device 500B according to the present embodiment. In the liquid crystal display device 500B illustrated in FIG. 27, the active matrix substrate 10 further includes a capacitance element 16. Hereinafter, the capacitance element 13 may be referred to as a "first capacitance element", and the capacitance element 16 may be referred to as a "second capacitance element".

The second capacitance element 16 includes the first capacitance electrode CE1, a third capacitance electrode CE3 disposed opposite the first capacitance electrode CE1 and between the first capacitance electrode CE1 and the substrate 10a, and further includes a dielectric layer DL' located between the first capacitance electrode CE1 and the third capacitance electrode CE3.

In this example, the third capacitance electrode CE3 is provided on the gate insulating layer 6 and is formed in the same layer as the source electrode 4 and the drain electrode 5 of the TFT 1. Also, the interlayer insulating layer 7 located between the first capacitance electrode CE1 and the third capacitance electrode CE3 functions as a dielectric layer DL'.

A direct current signal different from a COM potential is preferably supplied to the third capacitance electrode CE3. The direct current signal supplied to the third capacitance electrode CE3 is, for example, a VSS potential (a VGL potential supplied to the GOA circuit 12). In the present embodiment, a plurality of the second capacitance elements 16 are provided, and the third capacitance electrodes CE3 of the second capacitance elements 16 are formed separated from each other. That is, when all the third capacitance electrodes CE3 are collectively referred to as a "third capacitance electrode layer", this means that the third capacitance electrode layer is divided (subdivided) into a plurality of portions. The third capacitance electrode layer need not be divided. In a case in which the third capacitance electrode layer is not divided, one second capacitance element 16 is provided in the entire peripheral region FR.

In the liquid crystal display device 500B, the second capacitance element 16 is provided, and thus the potential variation of the first capacitance electrode CE1 can be absorbed by the second capacitance element 16.

Note that although in the example illustrated in FIG. 27, the third capacitance electrode CE3 is formed in the same layer as the source electrode 4 and the drain electrode 5 of the TFT 1, the third capacitance electrode CE3 may be formed in the same layer as the gate electrode 3 of the TFT 1.

Additionally, the second capacitance element 16 may have substantially the same structure as the capacitance element 13 described in the first to fourth embodiments. In other words, the first capacitance electrode CE1, the second capacitance electrode CE2, and the dielectric layer DL in the capacitance element 13 described in the first to fourth embodiments may correspond to the third capacitance electrode CE3, the first capacitance electrode CE1, and the dielectric layer DL' in the second capacitance element 16, respectively.

Figure 28:
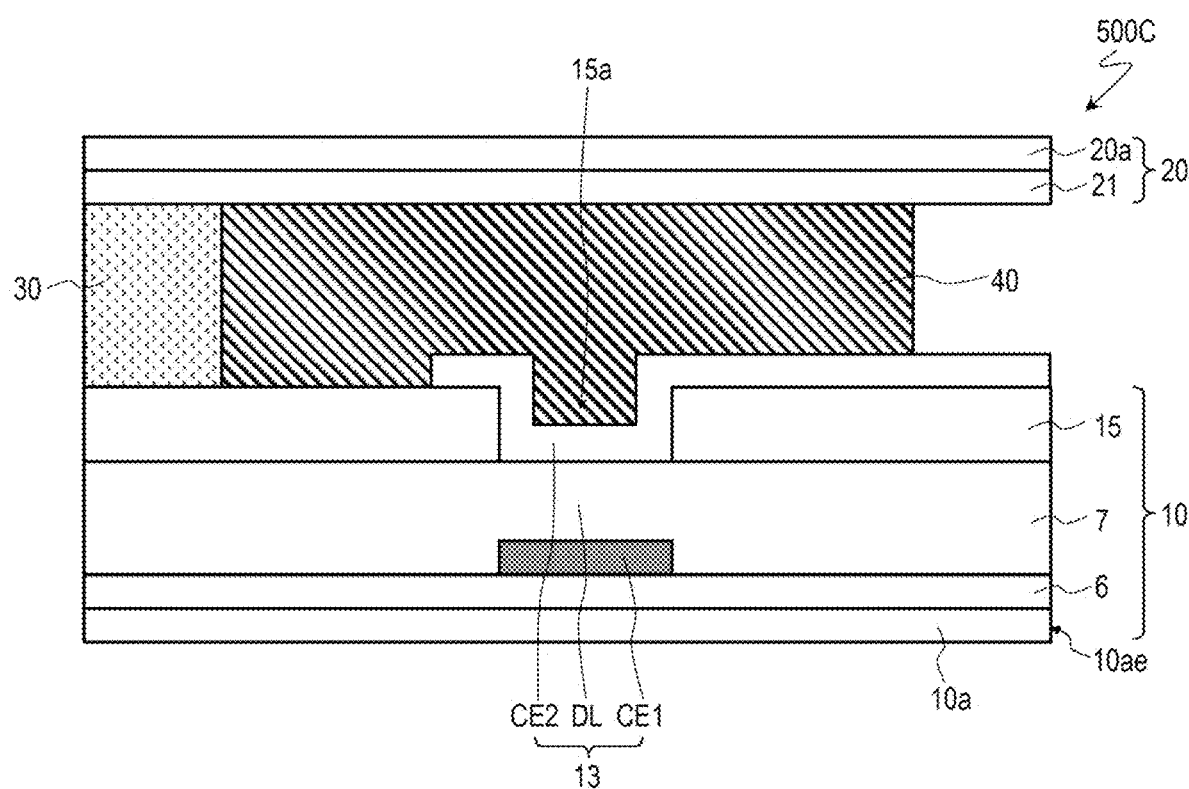
FIG. 28 is a cross-sectional view schematically illustrating yet another liquid crystal display device 500C according to an embodiment of the disclosure.

FIG. 28 illustrates yet another liquid crystal display device 500C according to the present embodiment. In the liquid crystal display device 500C illustrated in FIG. 28, the first capacitance electrode CE1 of the capacitance element 13 is provided on the gate insulating layer 6 and is formed in the same layer as the source electrode 4 and the drain electrode 5 of the TFT 1. A direct current signal (for example, a COM potential or a GND potential) is supplied to the first capacitance electrode CE1.

The second capacitance electrode CE2 is formed in the same layer as the pixel electrode 11 provided on the second interlayer insulating layer 15. In the second interlayer insulating layer 15, an opening (through-hole) 15a is formed in a region overlapping the first capacitance electrode CE1 when viewed from the direction normal to a display surface. The second capacitance electrode CE2 includes a portion located in the opening 15a.

In this manner, in a case in which the active matrix substrate 10 includes two or more insulating layers located between the first capacitance electrode CE1 and the second capacitance electrode CE2, the opening is formed in at least one of the two or more insulating layers; thus, the capacitance value of the capacitance element 13 can be sufficiently large.

An embodiment of the disclosure can provide a liquid crystal display device in which damage to a GOA circuit caused by an ESD is suppressed. An embodiment of the disclosure can be suitably applied to various liquid crystal display devices.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A liquid crystal display device comprising:
a plurality of pixels;
an active matrix substrate;
a counter substrate located opposite the active matrix substrate;
a liquid crystal layer provided between the active matrix substrate and the counter substrate; and
a sealing portion provided between the active matrix substrate and the counter substrate and disposed enclosing the liquid crystal layer,
wherein the active matrix substrate includes:
a substrate,
a gate wiring line drive circuit monolithically formed on the substrate,
a capacitance element supported by the substrate and provided at least partially overlapping the sealing portion when viewed from a direction normal to a display surface, the capacitance element including a first capacitance electrode, a second capacitance electrode disposed opposite the first capacitance electrode and between the first capacitance electrode and the sealing portion, and a dielectric layer located between the first capacitance electrode and the second capacitance electrode,
a transparent electrode formed of a transparent conductive material, disposed between the capacitance element and the sealing portion, and electrically connected to the second capacitance electrode, and
a plurality of the transparent electrodes formed separated from each other.

2. The liquid crystal display device according to claim 1, wherein an upper surface of the transparent electrode is in contact with the sealing portion.

3. The liquid crystal display device according to claim 1, wherein the transparent electrode extends to an end portion of the substrate.

4. The liquid crystal display device according to claim 1, wherein the second capacitance electrode includes a body portion located opposite the first capacitance electrode with the dielectric layer between the body portion and the first capacitance electrode and an extending portion extending from the body portion to an end portion of the substrate.

5. The liquid crystal display device according to claim 4, wherein the extending portion has a comb shape.

6. The liquid crystal display device according to claim 1, wherein the active matrix substrate further includes:
a thin film transistor (TFT) provided in each of the plurality of pixels and including a semiconductor layer, a gate electrode located opposite the semiconductor layer with a gate insulating layer between the gate electrode and the semiconductor layer, and a source electrode electrically connected to the semiconductor layer, and
a pixel electrode provided in each of the plurality of pixels and electrically connected to the TFT;
the first capacitance electrode is formed in a same layer as the gate electrode;
the second capacitance electrode is formed in a same layer as the source electrode;
the dielectric layer includes a first layer formed in a same layer as the gate insulating layer; and
the transparent electrode is formed in a same layer as the pixel electrode.

7. A liquid crystal display device comprising:
a plurality of pixels;
an active matrix substrate;
a counter substrate located opposite the active matrix substrate;
a liquid crystal layer provided between the active matrix substrate and the counter substrate; and
a sealing portion provided between the active matrix substrate and the counter substrate and disposed enclosing the liquid crystal layer,
wherein the active matrix substrate includes:
  a substrate,
  a gate wiring line drive circuit monolithically formed on the substrate,
  a capacitance element supported by the substrate and provided at least partially overlapping the sealing portion when viewed from a direction normal to a display surface, the capacitance element including a first capacitance electrode, a second capacitance electrode disposed opposite the first capacitance electrode and between the first capacitance electrode and the sealing portion, and a dielectric layer located between the first capacitance electrode and the second capacitance electrode,
  a transparent electrode formed of a transparent conductive material, disposed between the capacitance element and the sealing portion, and electrically connected to the second capacitance electrode,
  a thin film transistor (TFT) provided in each of the plurality of pixels and including a semiconductor layer, a gate electrode located opposite the semiconductor layer with a gate insulating layer between the gate electrode and the semiconductor layer, and a source electrode electrically connected to the semiconductor layer, and
  a pixel electrode provided in each of the plurality of pixels and electrically connected to the TFT;
wherein the first capacitance electrode is formed in a same layer as the gate electrode,
the second capacitance electrode is formed in a same layer as the source electrode,
the dielectric layer includes a first layer formed in the same layer as the gate insulating layer,
the transparent electrode is formed in a same layer as the pixel electrode,
the semiconductor layer of the TFT includes an intrinsic semiconductor layer and a doped semiconductor layer provided on the intrinsic semiconductor layer, and
the dielectric layer of the capacitance element further includes a second layer formed in the same layer as the intrinsic semiconductor layer and a third layer formed in the same layer as the doped semiconductor layer.

8. The liquid crystal display device according to claim 7,
wherein the active matrix substrate further includes a plurality of the capacitance elements; and
the second capacitance electrodes of the plurality of capacitance elements are formed separated from each other.

9. The liquid crystal display device according to claim 7,
wherein the active matrix substrate further includes a plurality of the transparent electrodes; and
the plurality of transparent electrodes are formed separated from each other.

10. A liquid crystal display device comprising:
a plurality of pixels;
an active matrix substrate;
a counter substrate located opposite the active matrix substrate;
a liquid crystal layer provided between the active matrix substrate and the counter substrate; and
a sealing portion provided between the active matrix substrate and the counter substrate and disposed enclosing the liquid crystal layer,
wherein the active matrix substrate includes:
  a substrate,
  a gate wiring line drive circuit monolithically formed on the substrate,
  a capacitance element supported by the substrate and provided at least partially overlapping the sealing portion when viewed from a direction normal to a display surface, the capacitance element including a first capacitance electrode, a second capacitance electrode disposed opposite the first capacitance electrode and between the first capacitance electrode and the sealing portion, and a dielectric layer located between the first capacitance electrode and the second capacitance electrode;
the second capacitance electrode is formed of a transparent conductive material, and
  a plurality of the second capacitance electrodes formed separated from each other.

11. The liquid crystal display device according to claim 10,
wherein an upper surface of the second capacitance electrode is in contact with the sealing portion.

12. The liquid crystal display device according to claim 10,
wherein the second capacitance electrode extends to an end portion of the substrate.

13. The liquid crystal display device according to claim 10,
wherein the active matrix substrate includes:
a thin film transistor (TFT) provided in each of the plurality of pixels and including a semiconductor layer, a gate electrode located opposite the semiconductor layer with a gate insulating layer between the gate electrode and the semiconductor layer, and a source electrode electrically connected to the semiconductor layer, and
a pixel electrode provided in each of the plurality of pixels and electrically connected to the TFT;
the first capacitance electrode is formed in a same layer as the gate electrode;
the second capacitance electrode is formed in a same layer as the pixel electrode; and
the dielectric layer includes a first layer formed in the same layer as the gate insulating layer.

14. The liquid crystal display device according to claim 13,
wherein the semiconductor layer of the TFT includes an intrinsic semiconductor layer; and
the dielectric layer of the capacitance element further includes a second layer formed in the same layer as the intrinsic semiconductor layer.

15. A liquid crystal display device comprising:
a plurality of pixels;
an active matrix substrate;
a counter substrate located opposite the active matrix substrate;

a liquid crystal layer provided between the active matrix substrate and the counter substrate; and a sealing portion provided between the active matrix substrate and the counter substrate and disposed enclosing the liquid crystal layer, wherein the active matrix substrate includes:
  a substrate,
  a gate wiring line drive circuit monolithically formed on the substrate,
  a capacitance element supported by the substrate and provided at least partially overlapping the sealing portion when viewed from a direction normal to a display surface, the capacitance element including a first capacitance electrode, a second capacitance electrode disposed opposite the first capacitance electrode and between the first capacitance electrode and the sealing portion, and a dielectric layer located between the first capacitance electrode and the second capacitance electrode, the second capacitance electrode is formed of a transparent conductive material,
  a thin film transistor (TFT) provided in each of the plurality of pixels and including a semiconductor layer, a gate electrode located opposite the semiconductor layer with a gate insulating layer between the gate electrode and the semiconductor layer, and a source electrode electrically connected to the semiconductor layer, and
  a pixel electrode provided in each of the plurality of pixels and electrically connected to the TFT;
the first capacitance electrode is formed in a same layer as the source electrode; and
the second capacitance electrode is formed in a same layer as the pixel electrode.

16. The liquid crystal display device according to claim 10,
  wherein the first capacitance electrode is formed of a transparent conductive material.

17. The liquid crystal display device according to claim 16,
  wherein the active matrix substrate includes an additional capacitance element including the first capacitance electrode, a third capacitance electrode disposed opposite the first capacitance electrode and between the first capacitance electrode and the substrate, and an additional dielectric layer located between the first capacitance electrode and the third capacitance electrode.

18. The liquid crystal display device according to claim 17,
  wherein the active matrix substrate further includes
  a thin film transistor (TFT) provided in each of the plurality of pixels and including a semiconductor layer, a gate electrode located opposite the semiconductor layer with a gate insulating layer between the gate electrode and the semiconductor layer, and a source electrode electrically connected to the semiconductor layer, and
  a pixel electrode provided in each of the plurality of pixels and electrically connected to the TFT;
  the second capacitance electrode is formed in a same layer as the pixel electrode; and
  the third capacitance electrode is formed in a same layer as the gate electrode or the source electrode.

19. The liquid crystal display device according to claim 10,
  Wherein the active matrix substrate further includes two or more insulating layers between the first capacitance electrode and the second capacitance electrode;
  an opening is formed in at least one insulating layer of the two or more insulating layers; and
  the second capacitance electrode includes a portion located in the opening.

20. The liquid crystal display device according to claim 15,
  wherein the active matrix substrate further includes a plurality of the second capacitance electrodes; and
  the plurality of second capacitance electrodes are formed separated from each other.

21. The liquid crystal display device according to claim 1,
  wherein a direct current signal is supplied to the first capacitance electrode.

* * * * *